US011919315B2

(12) United States Patent
Mizutani et al.

(10) Patent No.: US 11,919,315 B2
(45) Date of Patent: Mar. 5, 2024

(54) CARTRIDGE

(71) Applicant: SEIKO EPSON CORPORATION, Tokyo (JP)

(72) Inventors: Tadahiro Mizutani, Shiojiri (JP); Yoshihiro Koizumi, Shiojiri (JP); Shun Oya, Kiso-machi (JP); Takumi Nagashima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 142 days.

(21) Appl. No.: 17/703,349

(22) Filed: Mar. 24, 2022

(65) Prior Publication Data

US 2022/0305798 A1 Sep. 29, 2022

(30) Foreign Application Priority Data

Mar. 24, 2021 (JP) ................................ 2021-049535

(51) Int. Cl.
*B41J 2/175* (2006.01)

(52) U.S. Cl.
CPC ....... *B41J 2/17513* (2013.01); *B41J 2/17523* (2013.01); *B41J 2/17536* (2013.01)

(58) Field of Classification Search
CPC ........................ B41J 2/17513; B41J 2/17523; B41J 2/17536; B41J 2/17509; B41J 2/1752; B41J 2/1753; B41J 29/13; B41J 2/17553; B41J 2/1754
USPC ........................................................ 347/86
See application file for complete search history.

(56) References Cited

U.S. PATENT DOCUMENTS 4,907,019 A * 3/1990 Stephens .............. B41J 2/17553 285/914
2002/0109761 A1* 8/2002 Shimizu ................ B41J 2/1755 347/50
2008/0303880 A1* 12/2008 Ujita .................... B41J 2/17536 347/86
2013/0265373 A1* 10/2013 Ota ...................... B41J 2/17536 347/86
2015/0077478 A1* 3/2015 Kawabata ............ B41J 2/17553 347/86

FOREIGN PATENT DOCUMENTS

JP 2004-026259 A 1/2004

* cited by examiner

*Primary Examiner* — Matthew Luu
*Assistant Examiner* — Alexander D Shenderov
(74) *Attorney, Agent, or Firm* — Oliff PLC

(57) ABSTRACT

The cartridge includes a liquid containing portion containing a liquid, a liquid supply portion, an arrangement portion having a bottom wall in which an opening through which the liquid introduction portion is inserted is formed, and a film peelably attached to the arrangement portion while covering the opening portion, in which the arrangement portion further has a mounting element cooperating with the printing apparatus, and the film is arranged at a position where the film is interposed between the printing apparatus and the mounting element when a mounting process is performed in a state in which the film is attached to the arrangement portion.

6 Claims, 13 Drawing Sheets

CARTRIDGE

The present application is based on, and claims priority from JP Application Serial Number 2021-049535, filed Mar. 24, 2021, the disclosure of which is hereby incorporated by reference herein in its entirety.

BACKGROUND

1. Technical Field

The present disclosure relates to a technology of a cartridge.

2. Related Art

In the related art, a cartridge including a liquid supply portion, a peelable film closing the liquid supply portion has been known (see JP-A-2004-26259). The film prevents a liquid from the liquid supply portion from splashing.

In the related art, the film is peeled from the liquid supply portion along a peeling guide during the use of the cartridge. However, in the related art, the cartridge may be mounted in a printing apparatus in a state in which the film is not peeled from the liquid supply portion. In this case, the following various problems may occur. For example, in a process in which the cartridge is mounted in the printing apparatus with the film being attached to the liquid supply portion, a part of the film covering the liquid supply portion collides with a liquid introduction portion of the printing apparatus, such that the liquid in the liquid introduction portion may adhere to the film. When the liquid adheres to the film, the liquid may be dripped from the film to contaminate a periphery thereof with the liquid. In addition, for example, when the mounting of the cartridge in the printing apparatus is completed with the film being attached to the liquid supply portion, coupling between the liquid supply portion and the liquid introduction portion is not normally made by the film, and the liquid thus cannot smoothly flow in the liquid introduction portion from the liquid supply portion. Further, components on the printing apparatus side may be damaged by the film. Thus, a technology capable of preventing the omission of the peeling of the film has been demanded in the related art.

SUMMARY

According to an aspect of the present disclosure, there is provided a cartridge that is detachably mounted in a printing apparatus including a liquid introduction portion. The cartridge includes: a liquid containing portion containing a liquid; a liquid supply portion coupled to the liquid introduction portion and supplying the liquid to the printing apparatus; an arrangement portion having the liquid supply portion arranged inside thereof and having a bottom wall in which an opening portion through which the liquid introduction portion is inserted is formed; and a film peelably attached to the arrangement portion while covering the opening portion, in which the arrangement portion further has a mounting element cooperating with the printing apparatus in at least one of a mounting process which is a process for mounting the cartridge in the printing apparatus and a mounted state in which the cartridge is mounted in the printing apparatus, and the film is arranged at a position where the film is interposed between the printing apparatus and the mounting element when the mounting process is performed in a state in which the film is attached to the arrangement portion.

DESCRIPTION OF EXEMPLARY EMBODIMENTS

Figure 1:
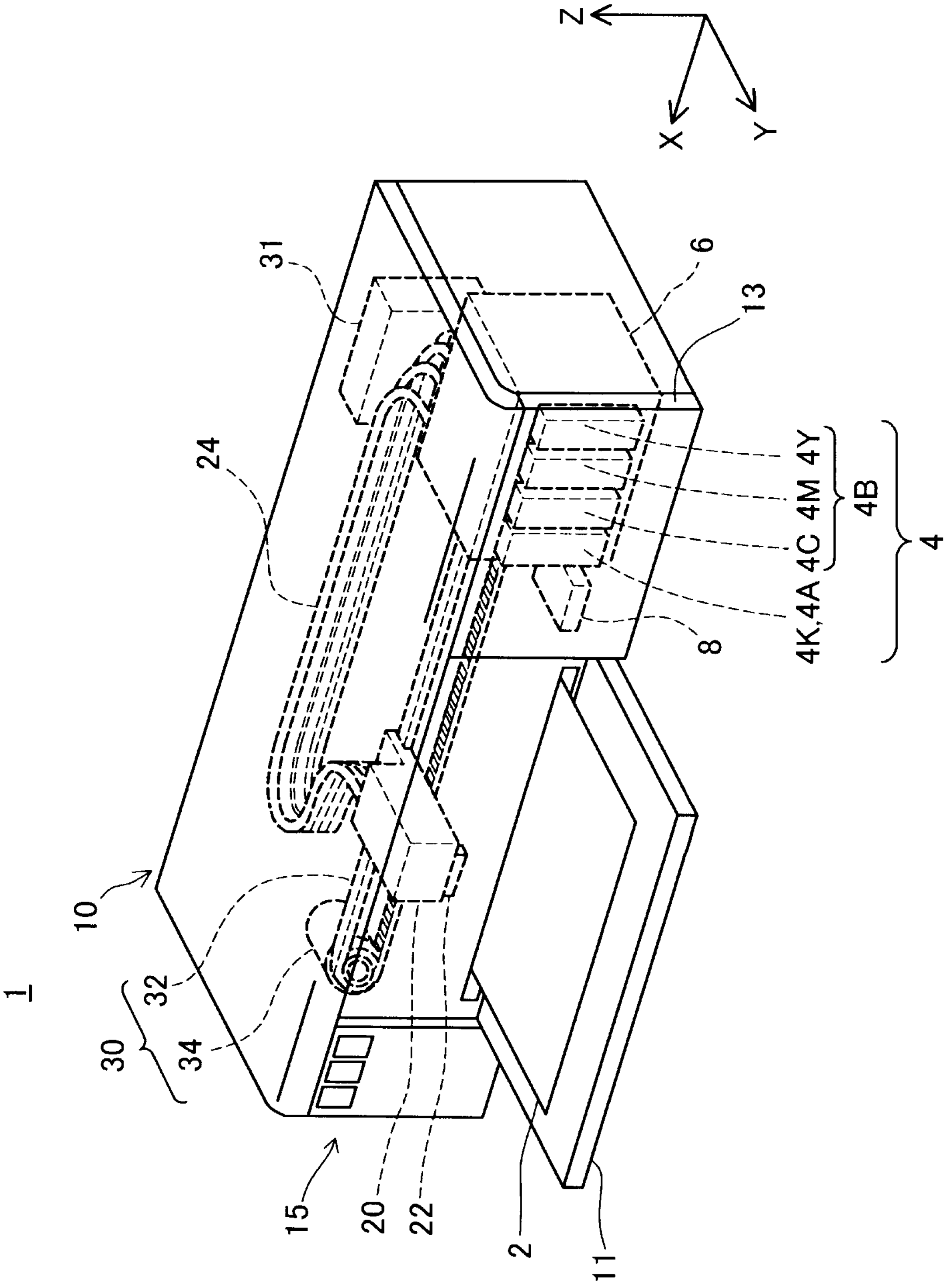
FIG. 1 is a perspective view illustrating a configuration of a printing system as an embodiment of the present disclosure.

A. Embodiment:

A-1. Configuration of Printing System:

FIG. 1 is a perspective view illustrating a configuration of a printing system 1 as an embodiment of the present disclosure. In FIG. 1, X, Y, and Z axes, which are three orthogonal spatial axes, are drawn. The directions in which the arrows of the X axis, the Y axis, and the Z axis are directed represent positive directions along the X axis, the Y axis, and the Z axis, respectively. The positive directions along the X axis, the Y axis, and the Z axis are denoted by a +X direction, a +Y direction, and a +Z direction, respectively. The reverse directions of the directions in which the arrows of the X axis, the Y axis, and the Z axis are directed are negative directions along the X axis, the Y axis, and the Z axis, respectively. The negative directions along the X axis, the Y axis, and the Z axis are denoted by a −X direction, a −Y direction, and a −Z direction, respectively. Directions along the X axis, the Y axis, and the Z axis regardless of whether being positive or negative are called an X direction, a Y direction, and a Z direction, respectively. This applies the same to the figures and descriptions to be described later.

The printing system 1 includes a printing apparatus 10, and a cartridge 4 supplying ink, which is a liquid, to the printing apparatus 10.

The printing apparatus 10 in the present embodiment is an ink jet printer that discharges the ink, as a liquid, from a discharge head 22. The printing apparatus 10 is a large printer that performs printing on a large-sized sheet (A2 to A0, and the like) such as a poster. The printing apparatus 10 includes a cartridge mounting portion 6, a control portion

31, a carriage 20, a discharge head 22, and a drive mechanism 30. In addition, the printing apparatus 10 includes an operation button 15 for a user to operate operations of the printing apparatus 10.

The cartridge mounting portion 6 has a first apparatus wall 67 located on the +Y direction side. The first apparatus wall 67 has an insertion/removal opening portion 674 as an inlet/outlet of the cartridge 4 to an accommodation chamber 61. The cartridge 4 is accommodated in the accommodation chamber 61 of the cartridge mounting portion 6 via the insertion/removal opening portion 674, and the cartridge 4 is removed from the accommodation chamber 61. A plurality of cartridges 4 are detachably mounted in the cartridge mounting portion 6. In the present embodiment, four types of cartridges 4, corresponding to ink having four colors of black, yellow, magenta, and cyan, are mounted in the cartridge mounting portion 6 one by one, that is, a total of four cartridges 4 are mounted in the cartridge mounting portion 6. The cartridge 4 containing black ink is referred to as a cartridge 4K, the cartridge 4 containing yellow ink is referred to as a cartridge 4Y, the cartridge 4 containing magenta ink is referred to as a cartridge 4M, and the cartridge 4 containing cyan ink is referred to as a cartridge 4C. In the present embodiment, the cartridge 4K is configured to contain more liquid than the cartridges 4C, 4M, and 4Y. Thus, the cartridge 4K is referred to as a first-type cartridge 4A, and the cartridges 4C, 4M, and 4Y are referred to as a second-type cartridge 4B.

The printing apparatus 10 has a replacement cover 13 on a front surface thereof in the +Y direction side. When the +Z direction side of the replacement cover 13 is tilted forward, that is, tilted to the +Y direction side, an opening of the cartridge mounting portion 6 appears and the cartridge 4 can be detached. When the cartridge 4 is mounted in the cartridge mounting portion 6, the ink can be supplied to the discharge head 22 that is provided on the carriage 20 via a tube 24 as a liquid circulating tube. In the present embodiment, the ink is supplied from the cartridge 4 to the discharge head 22 with a head difference. Specifically, the ink is supplied to the discharge head 22 due to a head difference between a liquid level of the ink in the cartridge mounting portion 6 and the discharge head 22. In another embodiment, a pump mechanism (not illustrated) of the printing apparatus 10 may suck the ink in the cartridge 4 to supply the ink to the discharge head 22. The tube 24 is provided for each type of the ink. Here, a state in which the cartridge 4 is mounted in the cartridge mounting portion 6 and the ink, as a liquid, can be supplied to the printing apparatus 10 is referred to as a "mounted state".

A nozzle for each type of ink is provided on the discharge head 22. The discharge head 22 discharges the ink from the nozzle toward a printing sheet 2 and prints data such as characters or images on the printing sheet 2. In the present embodiment, the printing apparatus 10 is a so-called "off-carriage type" printer in which the cartridge mounting portion 6 is not interlocked with the movement of the carriage 20. A technology of the present disclosure can also be applied to a so-called "on-carriage type" printer in which the cartridge mounting portion 6 is provided on the carriage 20 and the cartridge mounting portion 6 moves together with the carriage 20.

The control portion 31 controls each portion of the printing apparatus 10, and transmits and receives a signal to and from the cartridge 4. The carriage 20 relatively moves the discharge head 22 to the printing sheet 2.

The drive mechanism 30 reciprocates the carriage 20 based on a control signal from the control portion 31. The drive mechanism 30 includes a timing belt 32 and a drive motor 34. The carriage 20 reciprocates in a main scanning direction, which is a direction along the X direction, by transmitting power of the drive motor 34 to the carriage 20 via the timing belt 32. In addition, the printing apparatus 10 includes a transport mechanism for moving the printing sheet 2 in a sub-scanning direction which is the +Y direction. When printing is performed, the transport mechanism moves the printing sheet 2 in the sub-scanning direction, and the printed printing sheet 2 is output onto a front cover 11.

A region called a home position is provided at a position outside a printing region where the carriage 20 is moved in the main scanning direction, and a maintenance mechanism that performs maintenance to normally perform printing is mounted at the home position. The maintenance mechanism includes a cap member 8 that is pushed against a surface where the nozzle is formed on a bottom surface side of the discharge head 22 and forms a closed space so as to surround the nozzle, a lifting mechanism (not illustrated) that lifts the cap member 8 to be pushed against a nozzle surface of the discharge head 22, a suction pump (not illustrated) that introduces a negative pressure into the closed space where the cap member 8 is formed by being pushed against the nozzle surface of the discharge head 22, and the like.

In the present embodiment, in the use state of the printing system 1, an axis along the sub-scanning direction of transporting the printing sheet 2 is defined as the Y axis, an axis along the gravity direction is defined as the Z axis, and an axis along the movement direction of the carriage 20 is defined as the X axis. Here, "the use state of the printing system 1" refers to a state in which the printing system 1 is installed on a horizontal surface. In the present embodiment, the sub-scanning direction is defined as the +Y direction, a direction opposite to the +Y direction is referred to as the −Y direction, and the gravity direction is defined as the −Z direction, and the antigravity direction is defined as the +Z direction. The X direction and the Y direction are directions along the horizontal direction. When the printing system 1 is viewed from a front side, a direction from the left side to the right side is defined as the +X direction, and a direction opposite to the +X direction is defined as the −X direction. In the present embodiment, an insertion direction in which the cartridge 4 is inserted into the cartridge mounting portion 6 for mounting is defined as the −Y direction, and a direction in which the cartridge 4 is removed from the cartridge mounting portion 6 is defined as the +Y direction. Thus, in the cartridge mounting portion 6, a −Y direction side is referred to as a depth side, and a +Y direction side is referred to as a front side. In the present embodiment, an arrangement direction of the plurality of cartridges 4 is defined as the X direction.

Figure 2:
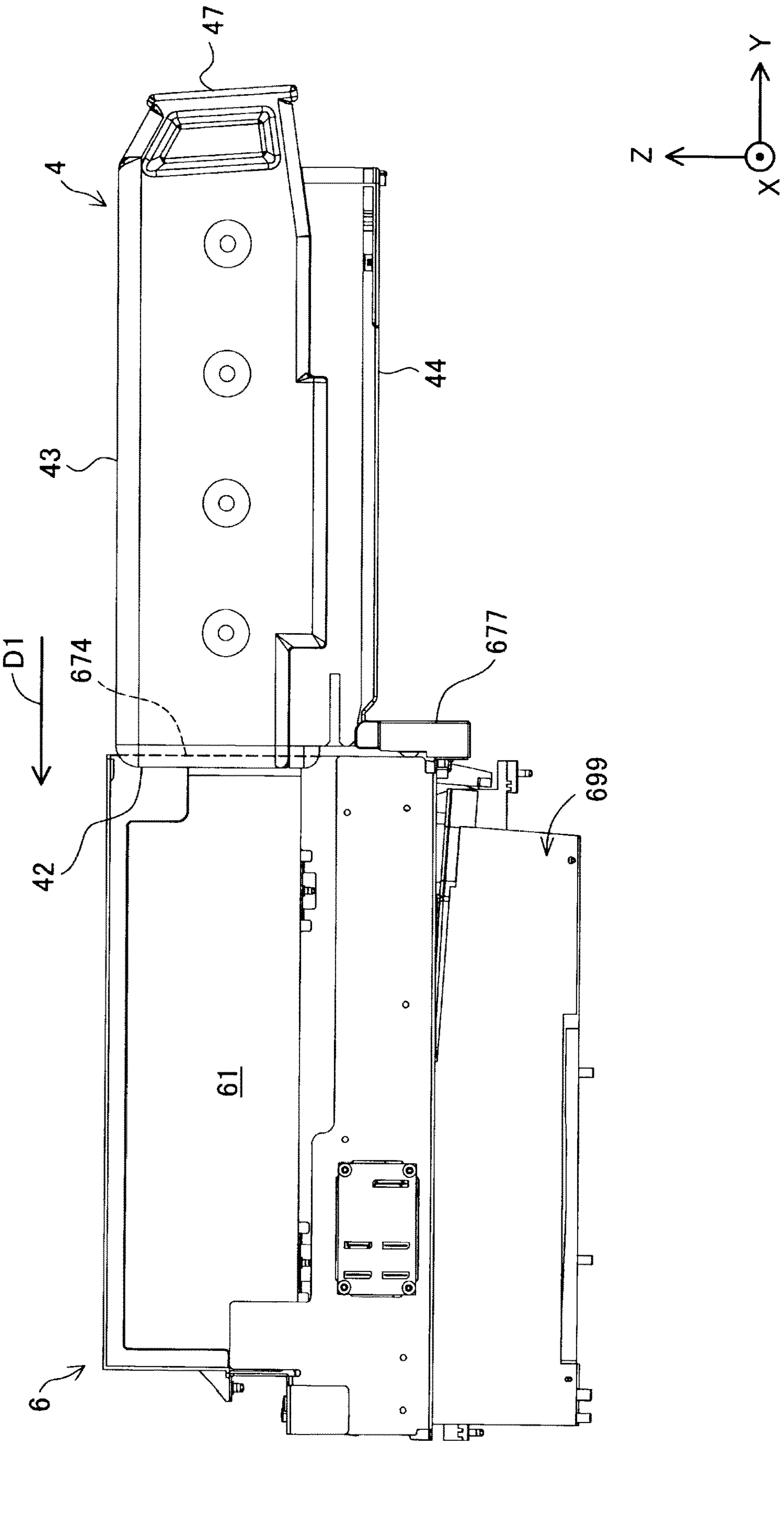
FIG. 2 is a first view illustrating a mounting process of the cartridge in a cartridge mounting portion.
Figure 3:
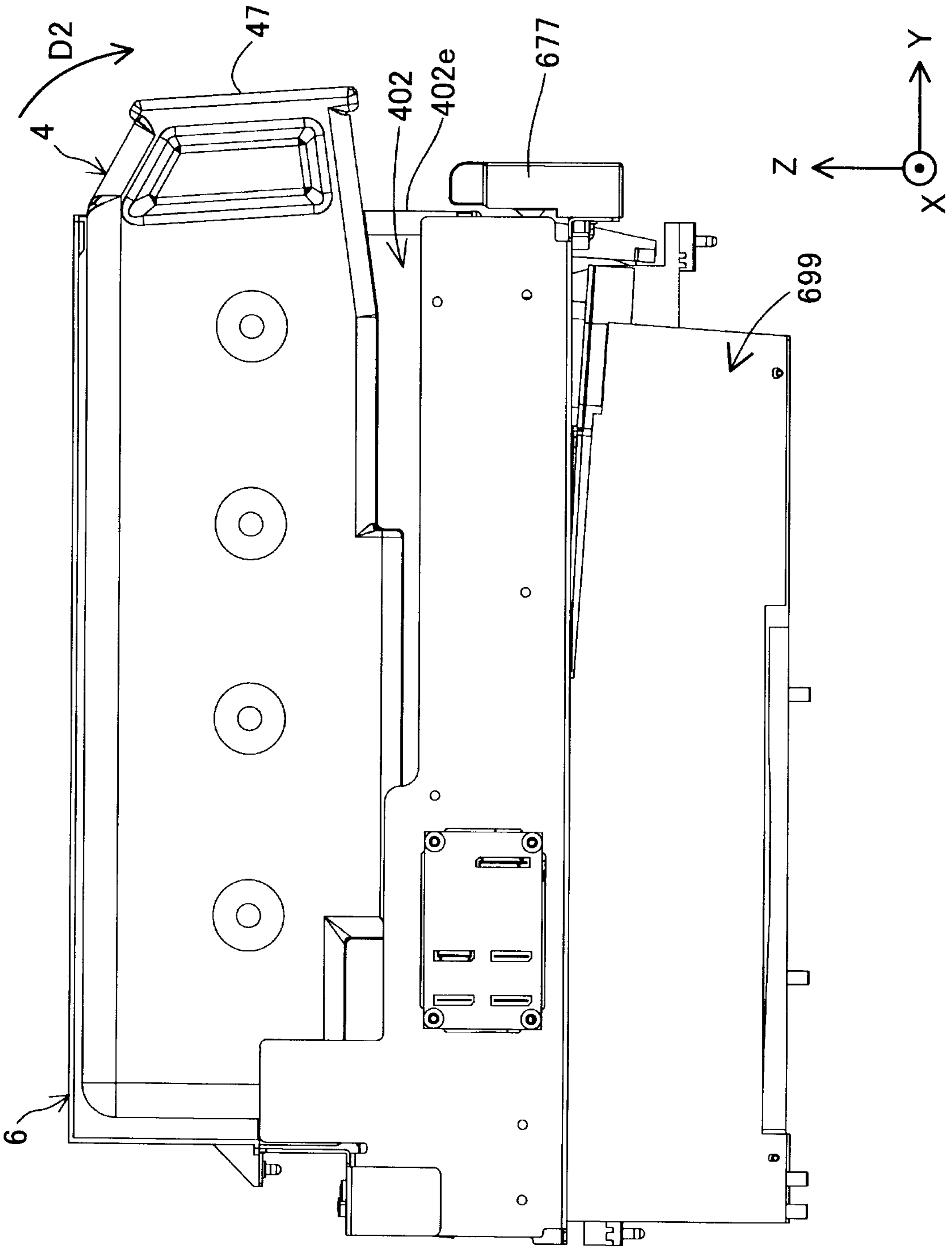
FIG. 3 is a second view illustrating the mounting process.
Figure 4:
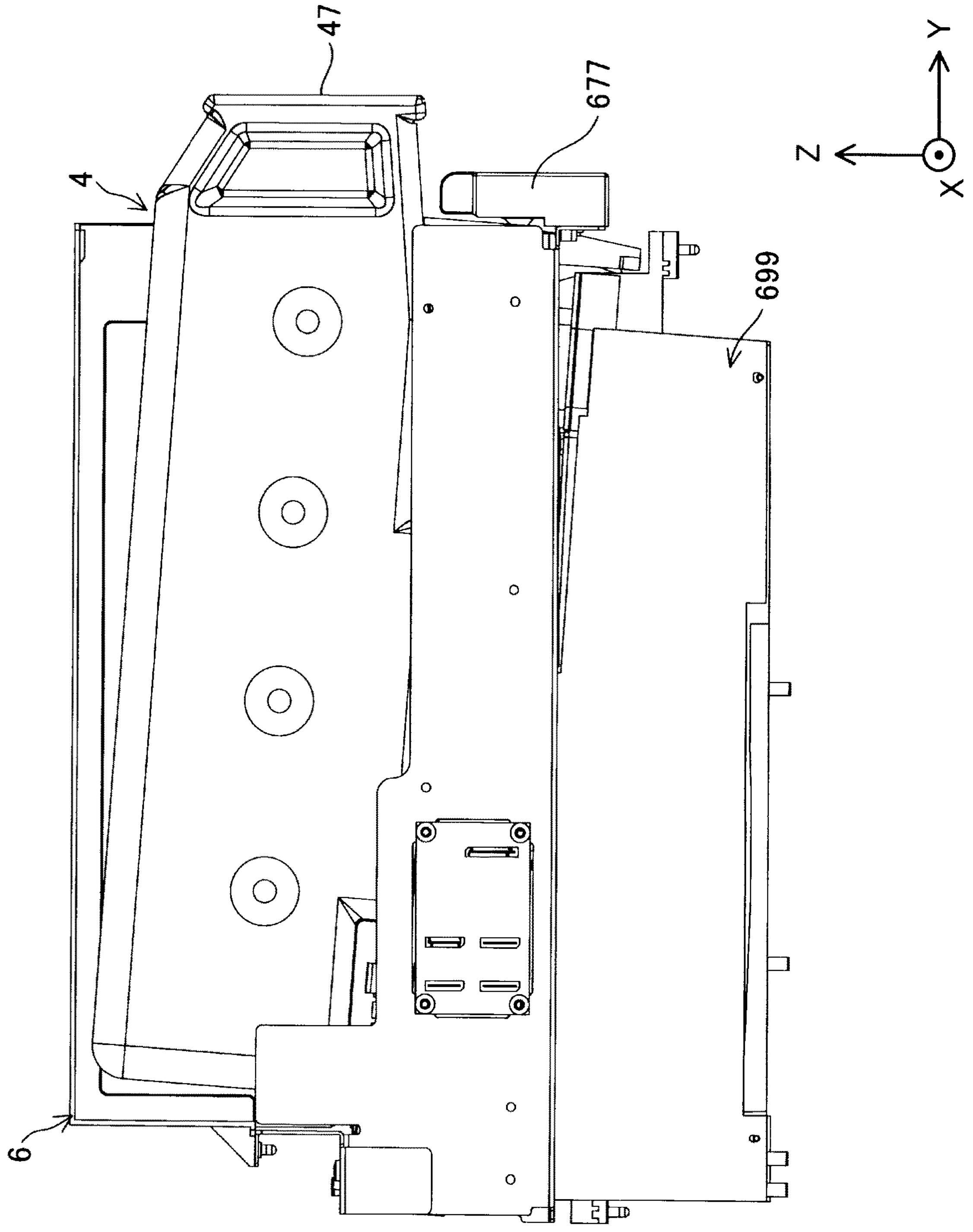
FIG. 4 is a view illustrating a mounted state in which the mounting of the cartridge in the cartridge mounting portion is completed.

A-2. Description of Mounting Process and Mounted State of Cartridge:

FIG. 2 is a first view illustrating a mounting process of the cartridge 4 in a cartridge mounting portion 6. FIG. 3 is a second view illustrating the mounting process. FIG. 4 is a view illustrating a mounted state in which the mounting of the cartridge 4 in the cartridge mounting portion 6 is completed.

The mounting process includes a terminal coupling process and a supply portion coupling process performed after the terminal coupling process. As illustrated in FIG. 2, the terminal coupling process is a process in which an apparatus-side terminal (to be described later) of the cartridge mounting portion 6 and a cartridge-side terminal (to be described later) of the cartridge 4 come into contact with and are electrically coupled to each other by moving the cartridge 4 in an insertion direction D1, which is the −Y direction, to insert the cartridge 4 into the accommodation chamber 61 of the cartridge mounting portion 6 via the insertion/removal opening portion 674 of the first apparatus wall 67. As illustrated in FIGS. 3 and 4, the supply portion coupling process is a process in which the liquid introduction portion (to be described later) of the cartridge mounting portion 6 and the liquid supply portion (to be described later) of the cartridge 4 are coupled to each other in a state in which the electrical coupling between the apparatus-side terminal and the cartridge-side terminal is maintained. Specifically, in the supply portion coupling process, the liquid introduction portion and the liquid supply portion are coupled to each other by rotatably moving a rear wall 47 side of the cartridge 4 in a coupling direction D2 indicated by an arrow around a rotation fulcrum 698 of the cartridge mounting portion 6. In the mounted state illustrated in FIG. 4, the cartridge 4 is engaged by an engagement forming body 677 that is provided on the first apparatus wall 67 side of the cartridge mounting portion 6 to hold the mounted state.

As illustrated in FIG. 4, when the cartridge 4 is removed from the cartridge mounting portion 6, the user lifts the rear wall 47 side of the cartridge 4 to rotatably move the rear wall 47 side in a coupling release direction D3, which is a direction opposite to the coupling direction D2, around the rotation fulcrum 698. When the rotatably moving the rear wall 47 side, the engagement by the engagement forming body 677 is released. After the cartridge 4 is rotatably moved in the coupling release direction D3 and becomes the state illustrated in FIG. 3, the cartridge 4 is moved in the +Y direction which is a removal direction, and thus removed from the cartridge mounting portion 6.

Figure 5:
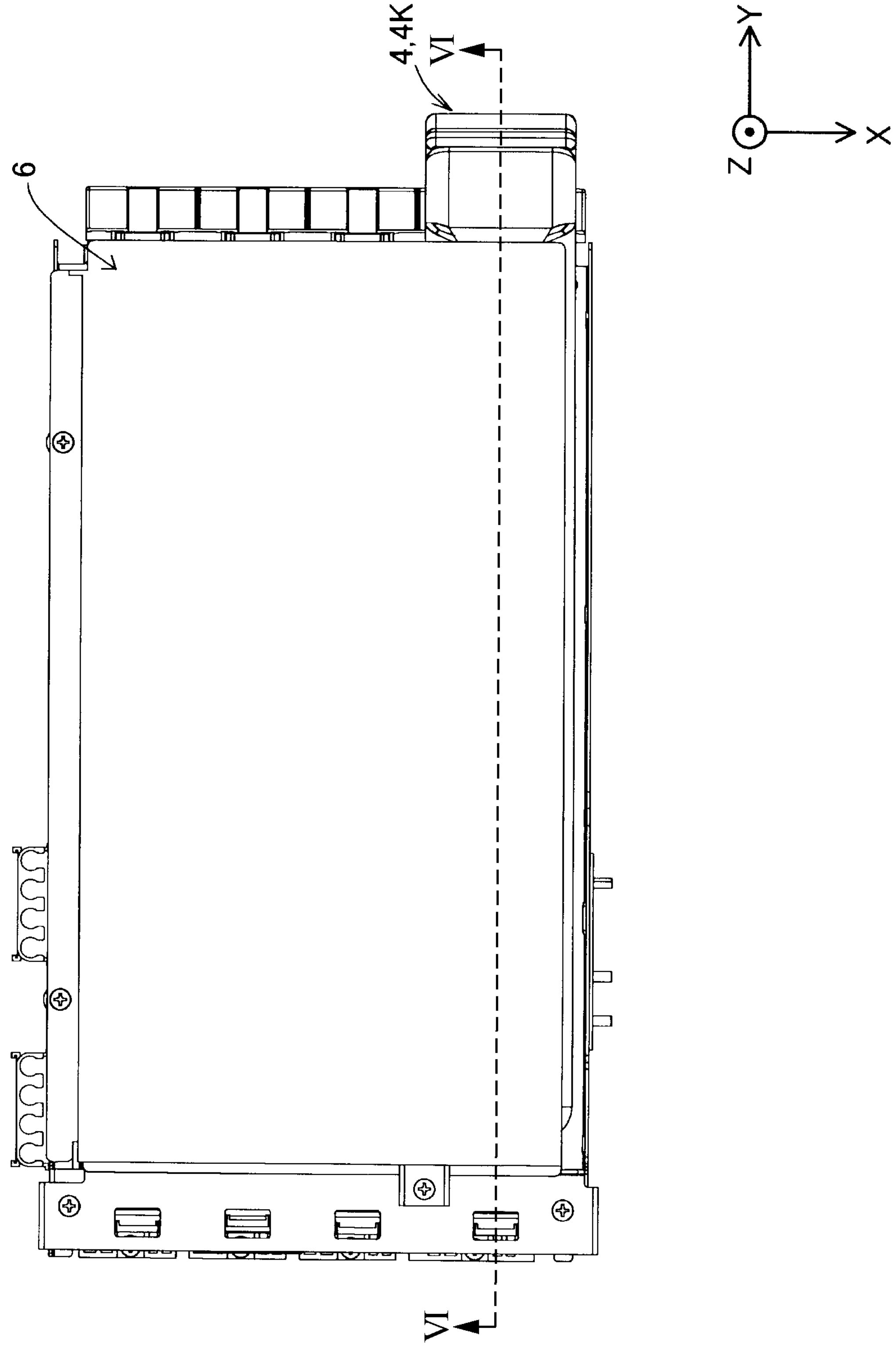
FIG. 5 is a view illustrating the cartridge mounting portion when viewed from a +Z direction.
Figure 6:
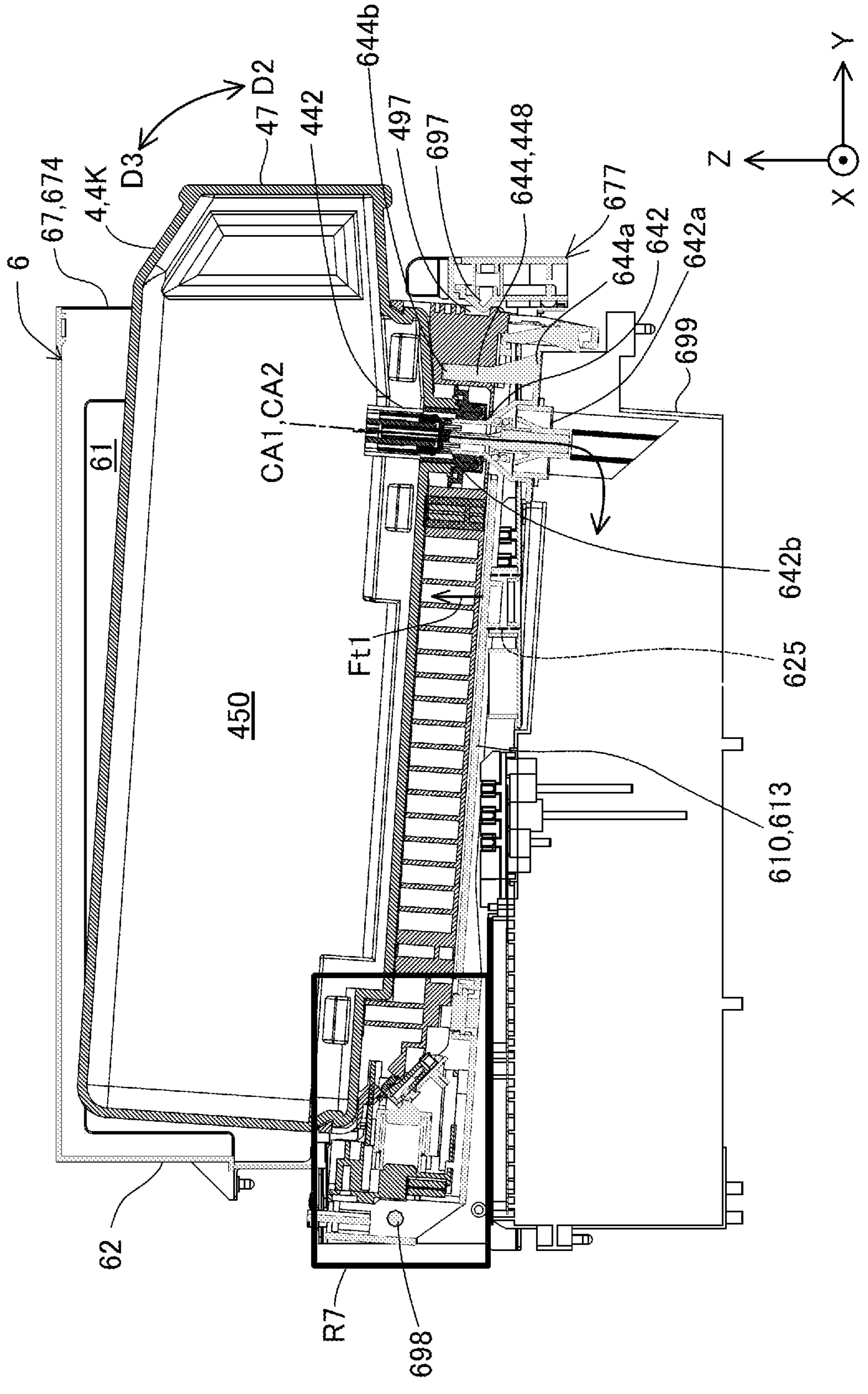
FIG. 6 is a cross-sectional view taken along line VI-VI in FIG. 5.
Figure 7:
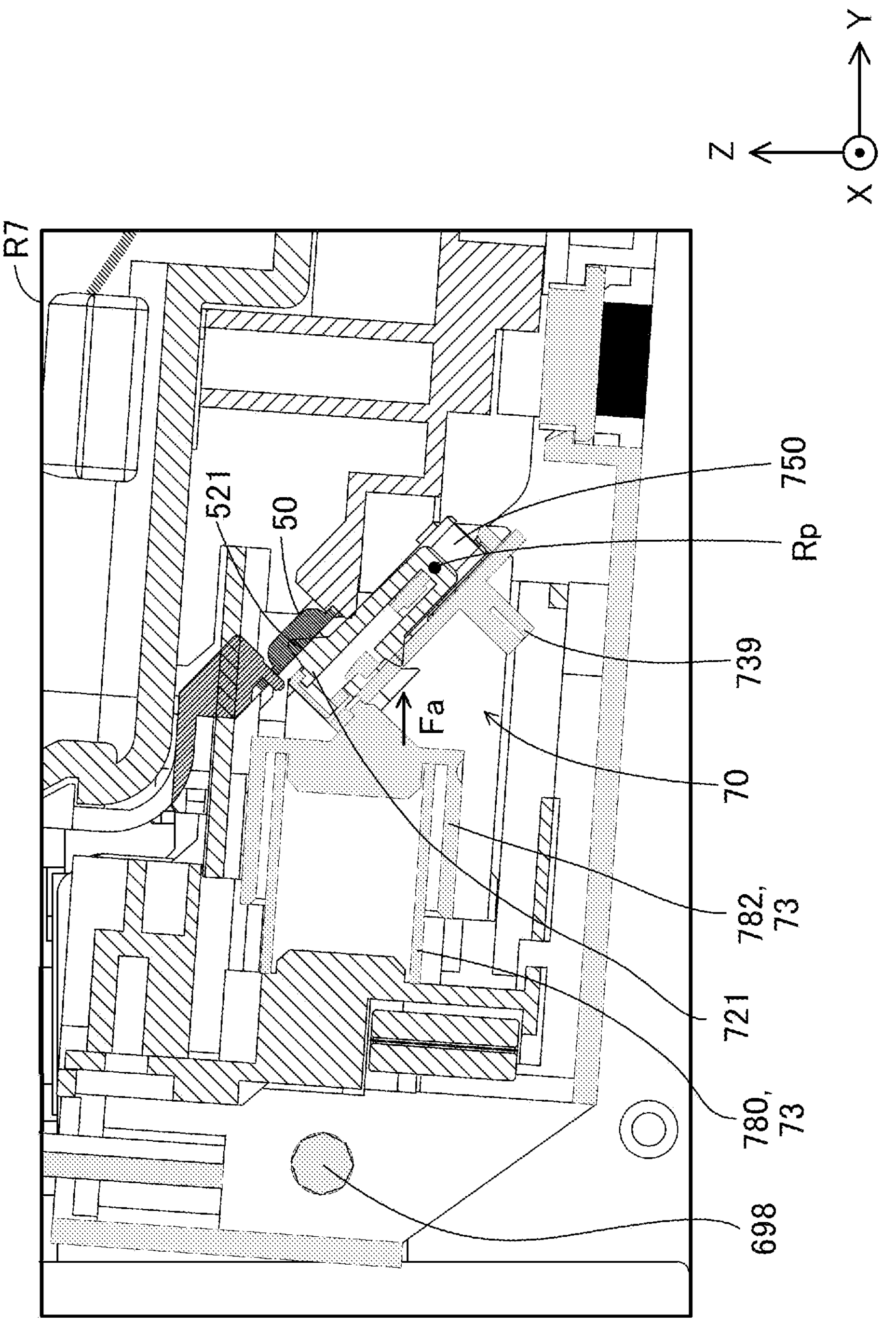
FIG. 7 is an enlarged view of a region in FIG. 6.

A-3. Detailed Description of Mounted State of Cartridge:

FIG. 5 is a view illustrating the cartridge mounting portion 6 when viewed from the +Z direction. FIG. 6 is a cross-sectional view taken along line VI-VI in FIG. 5. FIG. 7 is an enlarged view of region VII in FIG. 6. In FIG. 5, the cartridge 4K is mounted in the cartridge mounting portion 6. The mounted state of the cartridge 4 will be described with reference to FIGS. 5 to 7. The mounted state is the same for the cartridges 4C, 4M, 4Y, and 4K.

As illustrated in FIG. 6, the cartridge mounting portion 6 includes a support member 610 forming an accommodation chamber bottom wall of the accommodation chamber 61. The support member 610 supports the cartridge 4 from below. The cartridge 4 is supported by the support member 610 from the −Z direction side in a state in which the cartridge 4 is inserted into the accommodation chamber 61 of the cartridge mounting portion 6. Furthermore, the liquid supply portion 442 of the cartridge 4 is coupled to the liquid introduction portion 642 of the cartridge mounting portion 6 in the mounted state in which the cartridge 4 is mounted in the accommodation chamber 61 of the cartridge mounting portion 6. As a result, the liquid contained in a liquid containing portion 450 of the cartridge 4 is supplied to the liquid introduction portion 642 via the liquid supply portion 442. In the present embodiment, while the liquid is supplied from the liquid supply portion 442 to the liquid introduction portion 642, air contained in a liquid storage portion 699 of the cartridge mounting portion 6 becomes bubbles, and the bubbles circulate in the liquid introduction portion 642, the liquid supply portion 442, and the liquid containing portion 450. As a result, liquid-gas exchange in the liquid containing portion 450 is performed. In another embodiment, the cartridge 4 has an atmosphere communication path for allowing the liquid containing portion 450 to communicate with the outside, and the liquid-gas exchange may be performed via the atmosphere communication path. The atmosphere communication path is disposed at a different position from the liquid supply portion 442, and for example, is formed on a wall forming the liquid containing portion 450.

The liquid introduction portion 642 receives the liquid supplied from the cartridge 4. The liquid introduction portion 642 is a cylindrical member, and has an internal flow path for allowing the liquid to circulate therein. The liquid introduction portion 642 has a proximal end 642*a* and a distal end 642*b*. An opening communicating with an introduction portion flow path, which is the internal flow path, is formed in the distal end 642*b*, and the ink in the liquid supply portion 442 circulates through the introduction portion flow path via the opening. The proximal end 642*a* is coupled to the liquid storage portion 699, and the ink circulated through the introduction portion flow path circulates in the liquid storage portion 699. The liquid storage portion 699 is located on the −Z direction side of the accommodation chamber 61. The liquid storage portion 699 communicates with the discharge head 22 via the tube 24 illustrated in FIG. 1. As described above, the liquid introduction portion 642 communicates with the discharge head 22 via the liquid storage portion 699 and the tube 24. A central axis CA1 of the liquid introduction portion 642 is in parallel with a central axis CA2 of the liquid supply portion 442 in the mounted state, and tilted to the Z direction. That is, a direction along the central axis CA1, which is a direction in which the liquid introduction portion 642 extends, intersects with the insertion direction of the cartridge 4. A direction along the central axis CA2 of the liquid supply portion 442 is a direction along a direction in which the liquid supply portion 442 extends.

As illustrated in FIG. 7, in the mounted state of the cartridge 4, a circuit board 50 of the cartridge 4 and an apparatus-side terminal portion 70 of the cartridge mounting portion 6 are electrically coupled to each other by coming into contact with each other. The apparatus-side terminal portion 70 is held by a holding mechanism 73. The apparatus-side terminal portion 70 includes a plurality of apparatus-side terminals 721, a terminal holding portion 750, and a connector 739.

In the present embodiment, the plurality of (nine) apparatus-side terminals 721 are provided. Each of the plurality of apparatus-side terminals 721 is a metal plate member having conductivity. The apparatus-side terminal 721 has a terminal rotation fulcrum Rp, in which a portion where the terminal rotation fulcrum Rp is in contact with the cartridge-side terminal 521 of the circuit board 50, which is an end of the fulcrum, can be elastically deformed. A direction in which the portion where the terminal rotation fulcrum Rp is in contact with the cartridge-side terminal 521 of the circuit board 50 is elastically deformed is a direction along the X direction and the Z direction. The terminal holding portion 750 holds the plurality of apparatus-side terminals 721. The connector 739 is electrically coupled to the plurality of apparatus-side terminals 721. In addition, the connector 739 is electrically coupled to the control portion 31 of the printing apparatus 10 by wiring (not illustrated). As a result, data communication between the circuit board 50 and the control portion 31 is available.

The holding mechanism 73 includes a biasing member 780 and an attachment member 782. The biasing member 780 is composed of a coil spring. The biasing member 780 is disposed inside the attachment member 782. In addition, the apparatus-side terminal portion 70 is attached to the attachment member 782. The biasing member 780 is compressed in a state in which the insertion of the cartridge 4 into the cartridge mounting portion 6 is completed. As a result, the biasing member 780 applies an external force Fa via the attachment member 782 in a direction in which the apparatus-side terminal portion 70 is directed to a removal direction side of the cartridge 4, which is the first apparatus wall 67 side. Since the apparatus-side terminal portion 70 is pushed against the circuit board 50 by the external force Fa, the contact between the apparatus-side terminal 721 and the cartridge-side terminal 521 is maintained well.

As described above, the holding mechanism 73 holds the apparatus-side terminal portion 70 to be displaceable in a direction along the insertion direction of the cartridge 4. In addition, one end of the biasing member 780 on the apparatus-side terminal portion 70 side is configured to be slightly movable in the X direction and the Z direction intersecting with the insertion direction. As a result, the apparatus-side terminal portion 70 is held by a holding mechanism 73 to be slightly movable in the X direction and the Z direction intersecting with the insertion direction.

As illustrated in FIG. 6, in the supply port coupling process, the movement of the liquid supply portion 442 intersecting with the central axis CA2 of the liquid supply portion 442 is restricted by entering an apparatus-side supply portion positioning portion 644, which is a protrusion included in the cartridge mounting portion 6, into a supply portion positioning portion 448 having a recess shape and included in the cartridge 4. As a result, positioning of the liquid supply portion 442 to the liquid introduction portion 642 is performed. Specifically, in a step before the liquid introduction portion 642 is inserted into the liquid supply portion 442 of the cartridge 4, that is, in a step before the coupling between the liquid supply portion 442 and the liquid introduction portion 642 is started, the insertion of the apparatus-side supply portion positioning portion 644 into the supply portion positioning portion 448 is started. The apparatus-side supply portion positioning portion 644 has a substantially rectangular parallelepiped shape. The apparatus-side supply portion positioning portion 644 has one end 644*a* and the other end 644*b*. One end 644*a* is located on the liquid storage portion 699 side. One end 644*a* is located closer to the accommodation chamber 61 than the other end 644*b*.

In the mounted state of the cartridge 4, a main wall 613 forming a bottom portion of the support member 610 is tilted to the Y direction. Specifically, the main wall 613 of the support member 610 is tilted so as to be located on the −Z direction side, which is a lower side, toward the +Y direction side. The main wall 613 is in parallel to the Y direction in the initial arrangement state of the cartridge mounting portion 6 in which the cartridge 4 is not mounted.

In the mounted state of the cartridge 4, the cartridge mounting portion 6 includes the biasing member 625 that applies an external force Ft1 to the support member 610 in order to return the support member 610 to a position where the support member 610 is in the initial arrangement state. The biasing member 625 is a coil spring provided between the support member 610 and the liquid storage portion 699, and becomes a compressed state in the mounted state. The external force Ft1 having a +Z direction component is applied to the support member 610 depending on the compressed state. Meanwhile, in the mounted state of the cartridge 4, a cartridge engagement portion 497 of the cartridge 4 is engaged with a mounting engagement portion 697 of the cartridge mounting portion 6, and the mounted state is thus maintained. The mounting engagement portion 697 is formed on the engagement forming body 677 located on the first apparatus wall 67 side of the cartridge mounting portion 6.

As described above, as illustrated in FIG. 6, the support member 610 is pushed down in the coupling direction D2 around the rotation fulcrum 698, and the liquid supply portion 442 is thus pushed down and coupled to the liquid introduction portion 642. Further, the support member 610 is pushed up in the coupling release direction D3 around the rotation fulcrum 698, and the liquid supply portion 442 is thus pushed up and separated from the liquid introduction portion 642, and therefore, the coupling between the liquid supply portion 442 and the liquid introduction portion 642 is released.

Figure 8:
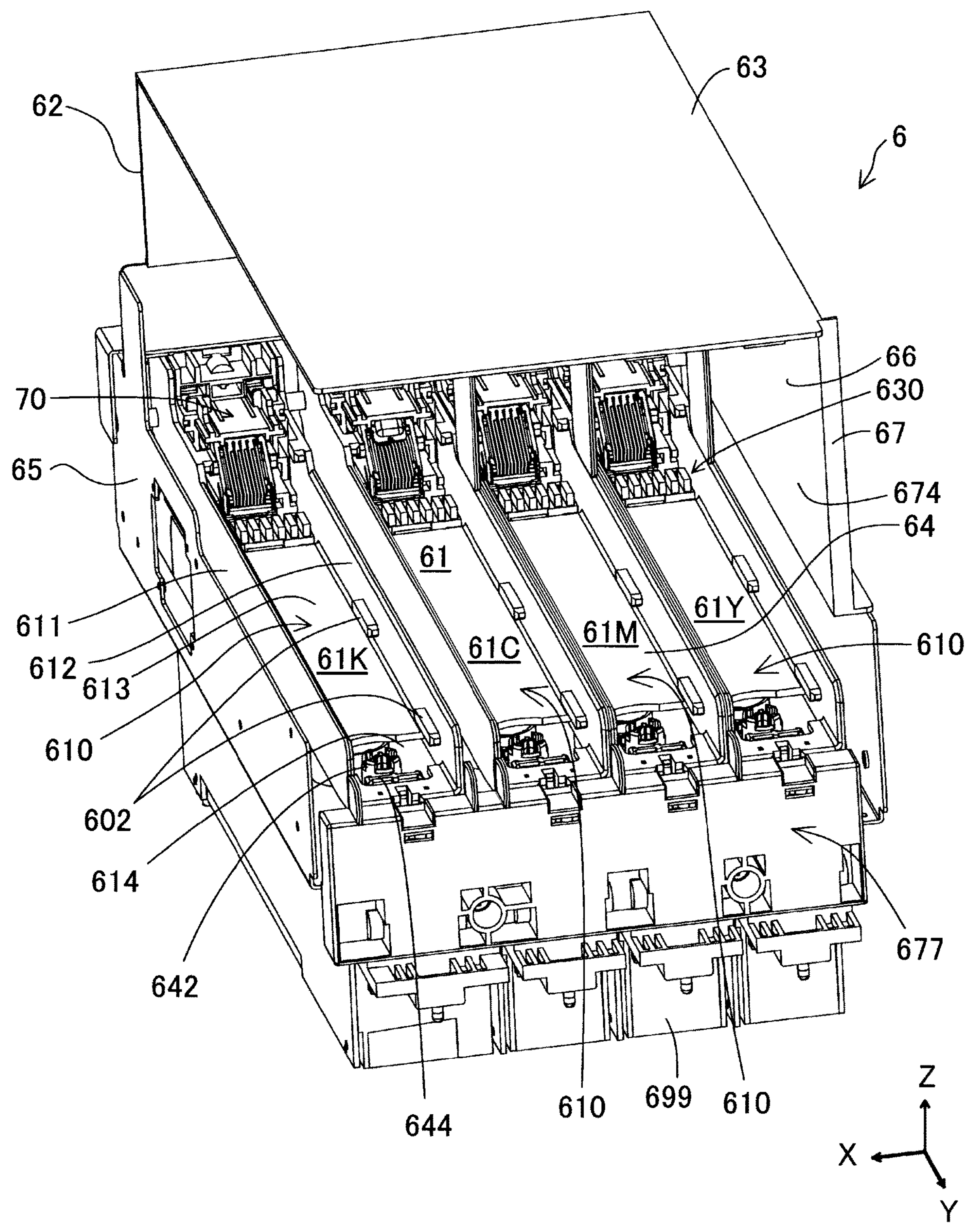
FIG. 8 is a perspective view illustrating the cartridge mounting portion.
Figure 9:
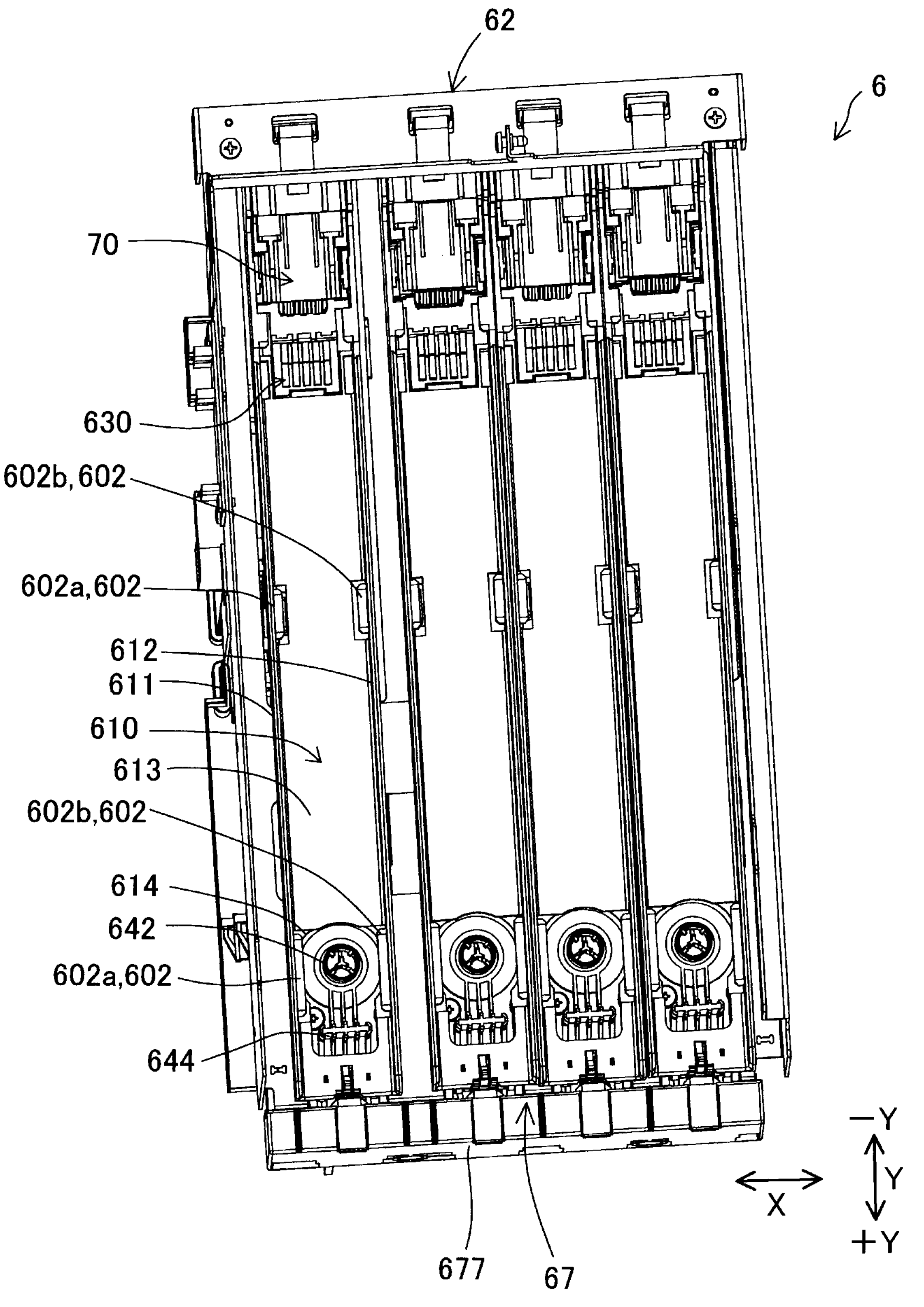
FIG. 9 is a view illustrating the cartridge mounting portion when viewed from the +Z direction.

A-4. Detailed Configuration of Cartridge Mounting Portion 6:

FIG. 8 is a perspective view illustrating the cartridge mounting portion 6. FIG. 9 is a view illustrating the cartridge mounting portion 6 when viewed from the +Z direction. In FIGS. 8 and 9, a partial configuration of the cartridge mounting portion 6 is not illustrated for the sake of easy understanding. For the cartridge mounting portion 6, the X direction is referred to as a width direction, the Y direction is referred to as a depth direction, and the Z direction is referred to as a height direction. Hereinafter, unless otherwise specified, each element will be described on the premise of the cartridge mounting portion 6 in the initial arrangement state in which the cartridge 4 is not mounted in the cartridge mounting portion 6.

As illustrated in FIG. 8, the cartridge mounting portion 6 forms the accommodation chamber 61 in which the cartridge 4 is accommodated. The accommodation chamber 61 has a substantially rectangular parallelepiped shape. In the accommodation chamber 61, slots 61C, 61M, 61Y and 61K, which are portions accommodating the cartridges 4C, 4M, 4Y, and 4K, respectively, correspond to appearance shapes of the cartridges 4C, 4M, 4Y, and 4K, respectively. In the present embodiment, a dimension in the X direction of the cartridge 4K is larger than those of other cartridges 4C, 4M, and 4Y in order to increase an amount of the liquid to be contained. Accordingly, in the present embodiment, a width of the slot 61K is larger than those of other slots 61C, 61M, and 61Y.

As illustrated in FIG. 8, the cartridge mounting portion 6 includes six apparatus walls 62, 63, 64, 65, 66, and 67 forming the accommodation chamber 61. In the present disclosure, the "wall" is a concept including a wall that is composed of a plurality of walls, in addition to a single wall. The first apparatus wall 67 forms the insertion/removal opening portion 674 through which the cartridge 4 passes when the cartridge is inserted into or removed from the accommodation chamber 61. The second apparatus wall 62 forms a wall of the accommodation chamber 61 on the −Y direction side. The second apparatus wall 62 faces the first apparatus wall 67 in the Y direction. The second apparatus wall 62 is a substantially vertical wall in the use state of the printing apparatus 10.

An apparatus upper wall 63 forms a wall of the accommodation chamber 61 on the +Z direction side. An apparatus bottom wall 64 faces the apparatus upper wall 63 in the Z direction, and forms a wall of the accommodation chamber 61 on the −Z direction side. The apparatus bottom wall 64 is formed by the support member 610. The apparatus bottom wall 64 has a plurality of apparatus opening portions 614. In the present embodiment, four apparatus opening portions 614 are formed according to the slots 61C, 61M, 61Y, and 61K. The apparatus upper wall 63 and the apparatus bottom wall 64 intersect with the second apparatus wall 62 and the first apparatus wall 67, respectively. In the present disclosure, "crossing" or "intersecting" means one of (i) a state in which two elements intersect with or actually cross each other, (ii) a state in which one element crosses with the other element when extended, and (iii) a state in which the two elements cross each other when extended.

A first apparatus side wall 65 forms a wall of the accommodation chamber 61 on the +X direction side. A second apparatus side wall 66 faces the first apparatus side wall 65 in the X direction, and forms a wall of the accommodation chamber 61 on the −X direction side. The first apparatus side wall 65 intersects with the second apparatus wall 62 and the first apparatus wall 67, and the second apparatus side wall 66 intersects with the apparatus upper wall 63 and the apparatus bottom wall 64.

As illustrated in FIGS. 8 and 9, the cartridge mounting portion 6 further includes the support member 610, the liquid introduction portion 642, the apparatus-side supply portion positioning portion 644, an apparatus guide portion 602, and the engagement forming body 677. A plurality of support members 610 are provided according to the number of cartridges 4 to be mounted. In the present embodiment, four support members 610 are provided. The support member 610 forms the apparatus bottom wall 64 of the accommodation chamber 61 on the gravity direction side. The support member 610 supports the cartridge 4 from the −Z direction side, which is the gravity direction side. The support member 610 is a member extending along the Y direction. The support member 610 has a recess shape. The support member 610 has the main wall 613, a first support side wall 611, and a second support side wall 612 which form the apparatus bottom wall 64.

The main wall 613 forms a recessed bottom portion located on the gravity direction side. In the main wall 613, the apparatus opening portion 614 is formed in the end on the first apparatus wall 67 side. The apparatus opening portion 614 penetrates the main wall 613 in a thickness direction of the main wall 613.

As illustrated in FIG. 8, the first support side wall 611 is raised in the +Z direction, which is the antigravity direction, from the end of the main wall 613 on the +X direction side. The second support side wall 612 is raised in the +Z direction from the end of the main wall 613 on the −X direction side. The first support side wall 611 and the second support side wall 612 face each other in the X direction.

The apparatus guide portion 602 guides the cartridge 4 in the insertion direction and removal direction thereof. The apparatus guide portion 602 is provided on each support member 610. The apparatus guide portion 602 is provided on each of the first support side wall 611 and the second support side wall 612. The apparatus guide portion 602 is a protrusion provided on each of the first support side wall 611 and the second support side wall 612. As illustrated in FIG. 9, a first apparatus guide portion **602*a* provided on the first support side wall 611 is a protrusion that protrudes toward the second support side wall 612 from the first support side wall 611. The first apparatus guide portion 602*a* extends along the Y direction. In addition, a plurality of first apparatus guide portions 602*a* are arranged with intervals in the Y direction. A second apparatus guide portion 602*b* provided on the second support side wall 612 is a protrusion that protrudes toward the first support side wall 611 from the second support side wall 612. The second apparatus guide portion 602*b* extends along the Y direction. A plurality of second apparatus guide portions 602*b*** are arranged with intervals in the Y direction.

As illustrated in FIGS. 8 and 9, the liquid introduction portion 642 receives the liquid supplied from the cartridge 4. In the initial arrangement state of the cartridge mounting portion 6, the liquid introduction portion 642 is not located in the accommodation chamber 61, and is located toward the −Z direction side from the accommodation chamber 61. That is, the liquid introduction portion 642 is located opposite to the support member 610 with the accommodation chamber 61 interposed therebetween. As a result, the cartridge 4 can be prevented from colliding with the liquid introduction portion 642, when the cartridge 4 is inserted into the accommodation chamber 61 of the cartridge mounting portion 6. As described above, as illustrated in FIG. 3, the distal end **642*b* of the liquid introduction portion 642 is arranged in the accommodation chamber 61 by rotatably moving the support member 610 in the coupling direction D2 around the rotation fulcrum 698 to push down the apparatus opening portion 614. That is, the rotation fulcrum 698 as a displacement mechanism rotatably moves the support member 610 to displace the apparatus opening portion 614 toward the gravity direction, and the distal end 642*b* of the liquid introduction portion 642 is thus arranged in the accommodation chamber 61 via the apparatus opening portion 614**.

The apparatus-side supply portion positioning portion 644 illustrated in FIG. 8 restricts the movement of the liquid supply portion 442 to the liquid introduction portion 642 by being accommodated in the supply portion positioning portion 448. As a result, positioning of the liquid supply portion 442 is performed. In the initial arrangement state of the cartridge mounting portion 6, the apparatus-side supply portion positioning portion 644 is not located in the accommodation chamber 61, and is located toward the −Z direction side from the accommodation chamber 61. That is, the apparatus-side supply portion positioning portion 644 is located opposite to the support member 610 with the accommodation chamber 61 interposed therebetween. As a result, the cartridge 4 can be prevented from colliding with the apparatus-side supply portion positioning portion 644, when the cartridge 4 is inserted into the accommodation chamber 61 of the cartridge mounting portion 6. The other end **644*b* of the apparatus-side supply portion positioning portion 644 is arranged in the accommodation chamber 61 by rotating the support member 610 in the coupling direction D2 around the rotation fulcrum 698 to push down the apparatus opening portion 614. That is, the rotation fulcrum 698 rotates the support member 610 to displace the apparatus opening portion 614, and the other end 644*b* of the apparatus-side supply portion positioning portion 644 is thus arranged in the accommodation chamber 61 via the apparatus opening portion 614**.

As illustrated in FIG. 9, the cartridge mounting portion 6 further includes the apparatus-side terminal portion 70 described above and an apparatus-side identification member 630. The apparatus-side identification member 630 is used to identify whether or not the correct type of the cartridge 4C, 4M, 4Y, or 4K is inserted into each of the slots 61C, 61M, 61Y, and 61K in the accommodation chamber 61. The apparatus-side identification member 630 forms different pattern shapes depending on colors of the liquid contained in the cartridges 4C, 4M, 4Y, and 4K. In FIG. 8, the apparatus-side identification member 630 in each slot 61C, 61M, 61Y, or 61K has the same pattern shape for convenience, but actually, has a different pattern shape. The apparatus-side identification member 630 is provided on the main wall 613 of the support member 610.

The apparatus-side identification member 630 is formed by at least one or more ribs. The pattern shape is determined by the number and position of the ribs. A cartridge-side identification member formed by the rib is also provided in the cartridge 4. The cartridge-side identification member forms different pattern shapes depending on types of the cartridge 4, that is, colors of the liquid contained in the cartridge 4. When the correct type of the cartridge 4 is inserted into the corresponding slots 61C to 61K, the apparatus-side identification member 630 does not collide with the cartridge-side identification member. On the other hand, when the wrong type of the cartridge 4 is inserted into the slots 61C to 61K, the apparatus-side identification member 630 collides with the cartridge-side identification member, and additional insertion of the cartridge 4 is hindered. As a result, it is possible to reduce a possibility that the wrong type of the cartridge 4 is mounted in each of the slots 61C to 61K of the cartridge mounting portion 6.

As illustrated in FIG. 8, the engagement forming body 677 is formed toward the +Y direction side from the support member 610. In addition, the engagement forming body 677 is located toward the −Z direction side from the insertion/removal opening portion 674. In the engagement forming body 677, four mounting engagement portions 697 illustrated in FIG. 3 are arranged corresponding to each of the slots 61C to 61K.

Figure 10:
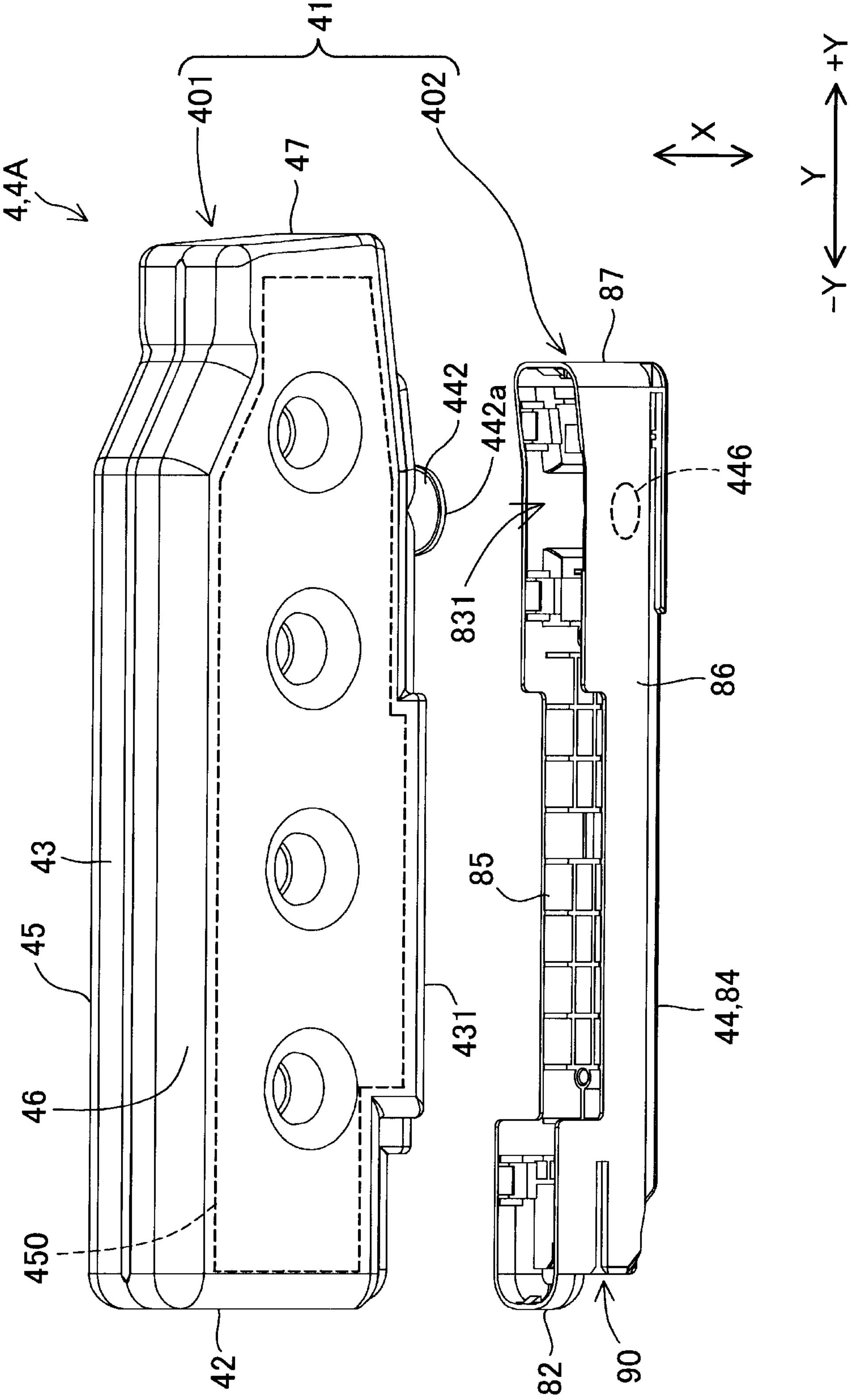
FIG. 10 is an exploded perspective view of a first-type cartridge.
Figure 11:
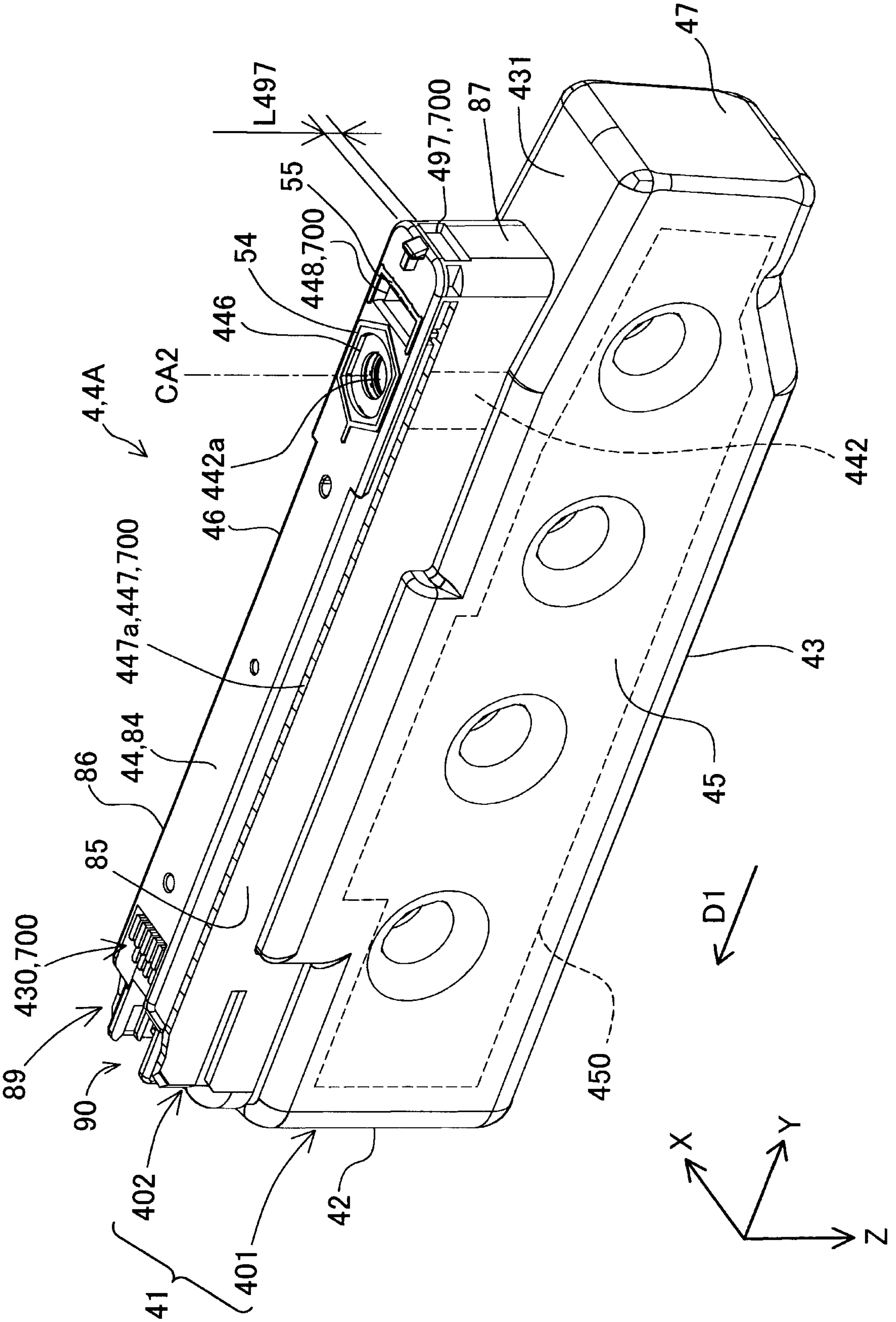
FIG. 11 is a perspective view of the first-type cartridge.
Figure 12:
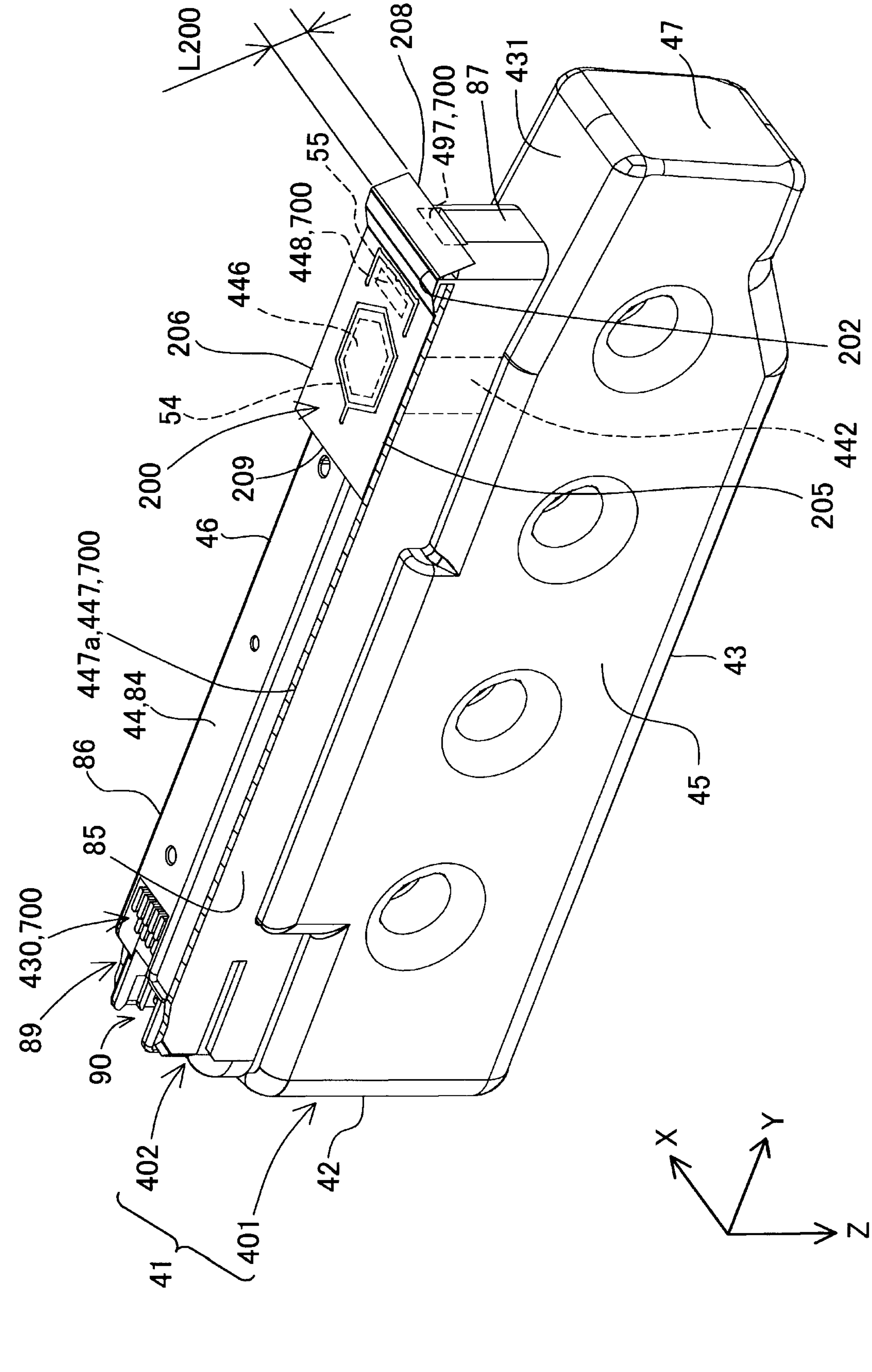
FIG. 12 is a second perspective view of the first-type cartridge to which a film is attached.
Figure 13:
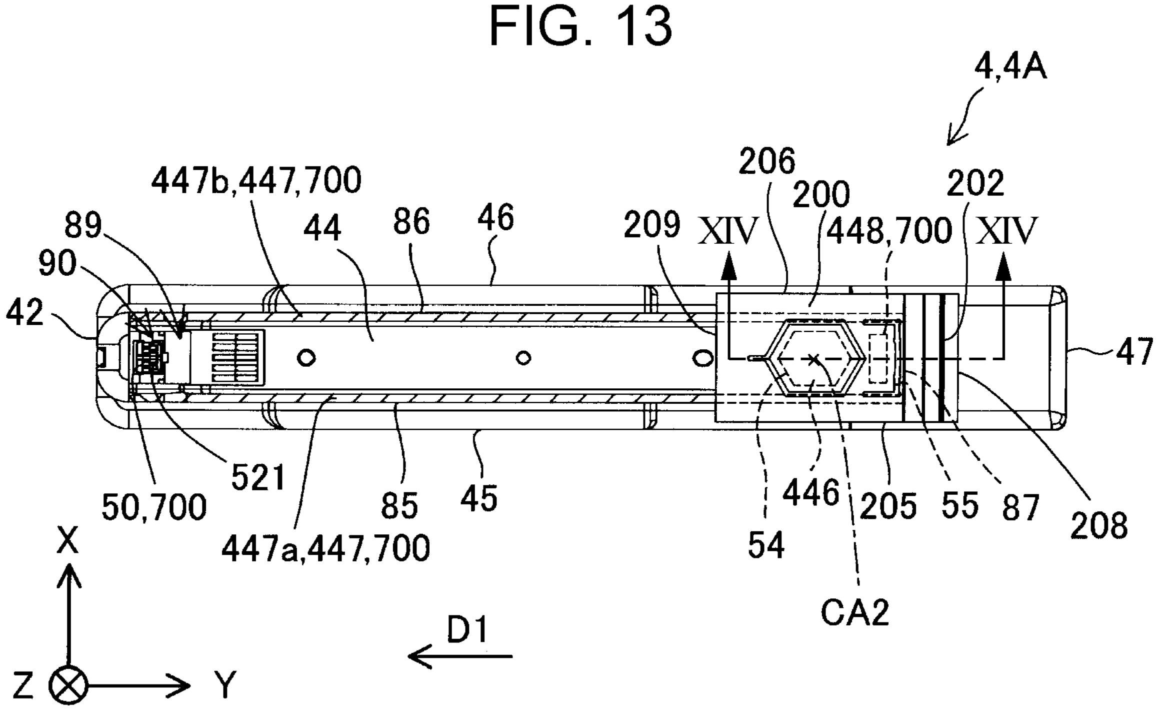
FIG. 13 is a bottom view of the first-type cartridge to which the film is attached.
Figure 14:
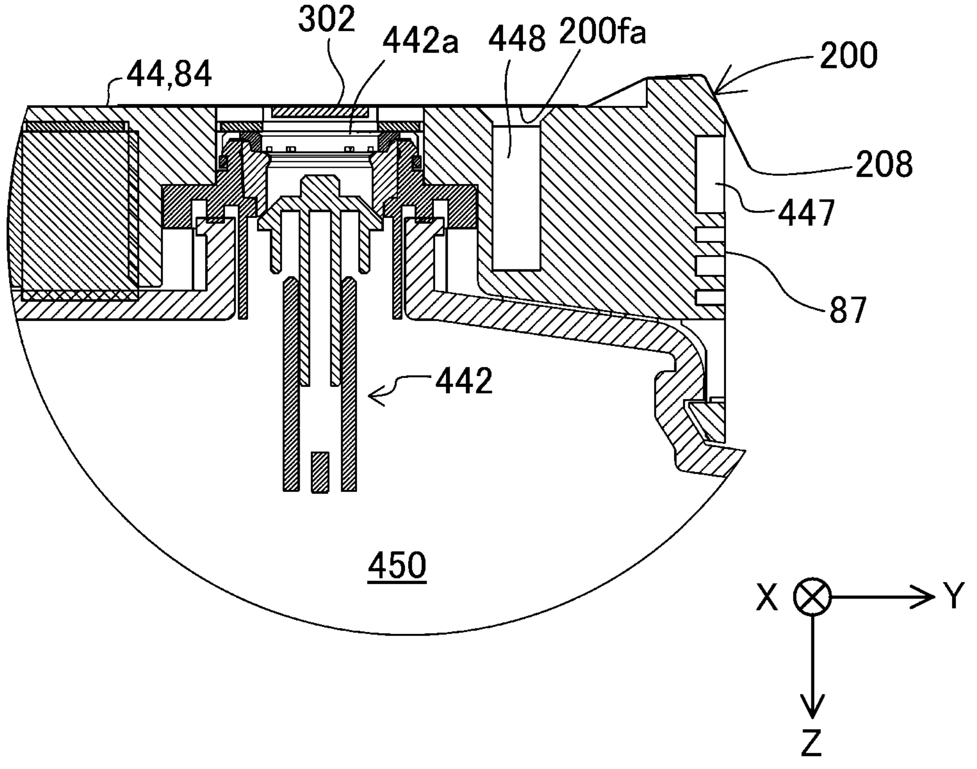
FIG. 14 is a partial cross-sectional view taken along line XIV-XIV in FIG. 13.

A-5. Detailed Configuration of Cartridge 4:

FIG. 10 is an exploded perspective view of the first-type cartridge 4A. FIG. 11 is a perspective view of the first-type cartridge 4A. FIG. 12 is a second perspective view of the first-type cartridge 4A to which a film 200 is attached. FIG. 13 is a bottom view of the first-type cartridge 4A to which the film 200 is attached. FIG. 14 is a cross-sectional view taken along line XIV-XIV in FIG. 13. In FIGS. 10 and 11, the film 200 is not illustrated. The first-type cartridge 4A and the second-type cartridge 4B illustrated in FIG. 1 have a difference in volume of the liquid containing portion 450. Specifically, a width of a liquid containing body 401 (to be described later) of the first-type cartridge 4A is larger than a width of the liquid containing body 401 of the second-type cartridge 4B. Therefore, the volumes of the liquid containing portions 450 in the first-type cartridge 4A and the second-type cartridge 4B are different. For the other configurations such as an adapter 402 and the film 200 as an arrangement portion, since the first-type cartridge 4A has the same configuration as the second-type cartridge 4B, in the following, detailed descriptions of the cartridge 4 will be described with reference to the first-type cartridge 4A. In the following, the first-type cartridge 4A is simply referred to as the cartridge 4. In the drawings illustrating the cartridge 4, the X, Y, and Z directions are based on a completed state of the terminal coupling process in FIG. 3, which is a state in which the insertion of the cartridge 4 into the cartridge mounting portion 6 is completed. That is, in the drawings illustrating the cartridge 4, the X, Y, and Z directions are based on a state before the supply portion coupling process in which the support member 610 is rotatably moved.

As illustrated in FIG. 11, an appearance of the cartridge 4 has a substantially rectangular parallelepiped shape. In the cartridge 4, a direction along the −Y direction, which is the insertion direction of the cartridge mounting portion 6, is defined as a longitudinal direction, the X direction is defined as a lateral direction as a width direction, and the Z direction is defined as a height direction. A dimension of the cartridge 4 in the longitudinal direction is the largest, and a dimension of the cartridge 4 in the lateral direction is the smallest.

The cartridge 4 includes a cartridge main body 41, and the circuit board 50 (illustrated in FIG. 13) attached to the cartridge main body 41. In the present embodiment, the cartridge main body 41 is composed of two members as illustrated in FIG. 10. Specifically, the cartridge main body 41 includes the liquid containing body 401, and the adapter 402, as an arrangement portion, attached to the liquid containing body 401 by engagement. In other embodiments, the cartridge main body 41 may be integrally formed.

The liquid containing body 401 and the adapter 402 are each molded by, for example, injection molding a synthetic resin such as polypropylene. The liquid containing body 401 and the adapter 402 may be formed of the same material or different materials.

As illustrated in FIG. 11, the cartridge main body 41 has a front wall 42, a rear wall 47, an upper wall 43, a bottom wall 44, a first side wall 45 as a side wall, a second side wall 46 as a side wall, and a corner portion 89. The walls 42, 43, 44, 45, 46, and 47 are referred to as surfaces 42, 43, 44, 45, 46, and 47, respectively. The front wall 42 and the rear wall 47 face each other in the Y direction along the insertion direction. The upper wall 43 and the bottom wall 44 face each other in the Z direction. The Z direction is parallel with the central axis CA2 along the direction in which the liquid supply portion 442 extends. The first side wall 45 and the second side wall 46 face each other in the X direction.

The front wall 42 is located on the insertion direction D1 side in which the cartridge 4 is inserted into the cartridge mounting portion 6. That is, the front wall 42 forms an insertion distal end surface on the −Y direction side, which is the insertion direction D1 side. That is, the rear wall 47 forms a surface on the +Y direction side, which is the removal direction. The upper wall 43 is located on the +Z direction side, and intersects with the front wall 42 and the rear wall 47. The bottom wall 44 is located on the −Z direction side, which is the gravity direction side in the mounted state, and forms a coupling distal end surface in the coupling direction D2 illustrated in FIG. 3. That is, the bottom wall 44 is located on the coupling direction D2 side. The bottom wall 44 intersects with the front wall 42 and the rear wall 47. An opening portion 446 through which the liquid introduction portion 642 is inserted is formed in the bottom wall 44. A positional relationship in which the opening portion 446 and the liquid supply portion 442 overlap is made, when the cartridge 4 is viewed from the bottom wall 44. In the present embodiment, the liquid supply portion 442 is arranged so that the central axis CA2 of the liquid supply portion 442 passes through the opening portion 446. As illustrated in FIGS. 11 and 14, the bottom wall 44 faces a supply portion distal end 442*a* of the liquid supply portion 442 in the Z direction.

The first side wall 45 is located on the −X direction side, and the second side wall 46 is located on the +X direction side. The first side wall 45 intersects with the front wall 42 and the rear wall 47, and the second side wall 46 intersects with the upper wall 43 and the bottom wall 44. The first side wall 45 and the second side wall 46 each extend along the insertion direction D1. The corner portion 89 is provided at a corner part where the front wall 42 intersects with the bottom wall 44. The corner portion 89 has a terminal arrangement portion 90 having a recess shape recessed inwardly. As illustrated in FIG. 13, the circuit board 50 is attached to the terminal arrangement portion 90.

As illustrated in FIG. 10, the liquid containing body 401 has the liquid containing portion 450 containing the liquid, and the liquid supply portion 442. The liquid supply portion 442 is a cylindrical member protruding from a containing body bottom wall 431 of the liquid containing body 401 that faces the upper wall 43. The liquid supply portion 442 is coupled to the liquid introduction portion 642 in the mounted state, and supplies the liquid in the liquid containing portion 450 to the discharge head 22 of the printing apparatus 10 via the liquid introduction portion 642. As illustrated in FIGS. 11 and 14, the liquid supply portion 442 has the supply portion distal end 442*a* as a distal end that forms an opening that allows the liquid to lead to the outside.

As illustrated in FIG. 10, the adapter 402 as an arrangement portion includes an adapter front wall 82 as an arrangement portion front wall, an adapter rear wall 87 as an arrangement portion rear wall, an adapter bottom wall 84 as an arrangement portion bottom wall, a first adapter side wall 85 as a first arrangement portion side wall, and a second adapter side wall 86 as a second arrangement portion side wall. The adapter front wall 82 constitutes a part of the front wall 42, and forms an insertion distal end surface on the −Y direction side which is the insertion direction. The adapter rear wall 87 constitutes a part of the rear wall 47, and faces the adapter front wall 82 in the Y direction. The adapter bottom wall 84 constitutes the bottom wall 44. The adapter bottom wall 84 intersects with the adapter front wall 82 and the adapter rear wall 87.

The first adapter side wall 85 intersects with the adapter bottom wall 84, and extends in the Y direction which is a longitudinal direction of the adapter 402. The first adapter side wall 85 is a plate-shaped wall that is raised from the adapter bottom wall 84 toward the liquid containing body 401. The second adapter side wall 86 faces the first adapter side wall 85 in the X direction which is a lateral direction of the adapter 402. The second adapter side wall 86 intersects with the adapter bottom wall 84, and extends in the Y direction which is the longitudinal direction of the adapter 402. The second adapter side wall 86 is a plate-shaped wall that is raised from the adapter bottom wall 84 toward the liquid containing body 401.

The adapter 402 has a recess shape having the adapter bottom wall 84 as a bottom. A side of the adapter 402 that faces the adapter bottom wall 84 is open, and the liquid supply portion 442 is arranged inside the adapter 402 via the opening. A part of the adapter 402 in which the liquid supply portion 442 is arranged is referred to as a supply portion arrangement portion 831. As illustrated in FIG. 11, the adapter bottom wall 84 has the opening portion 446 through which the liquid introduction portion 642 is inserted at a position facing the supply portion distal end 442*a*.

As illustrated in FIG. 11, the adapter 402 as an arrangement portion further has a mounting element 700 that cooperates with the cartridge mounting portion 6 in at least one of the mounting processes, which is a process for mounting the cartridge 4 in the cartridge mounting portion 6 of the printing apparatus 10, and the mounted state in which the cartridge 4 is mounted in the cartridge mounting portion 6. The mounting element 700 mechanically cooperates with the cartridge mounting portion 6 by coming into contact with the cartridge mounting portion 6, engaging with the cartridge mounting portion 6, or being inserted through the cartridge mounting portion 6, for example. The mounting element 700 has a cartridge-side identification member 430, a cartridge guide portion 447, the supply portion positioning portion 448, the cartridge engagement portion 497, and the circuit board 50 illustrated in FIG. 13.

The cartridge-side identification member 430 illustrated in FIG. 11 is provided at an end of the bottom wall 44 on the front wall 42 side. The cartridge-side identification member 430 is formed by at least one or more ribs. A pattern shape of the cartridge-side identification member 430 is determined by the number and position of the ribs. The pattern shape varies depending on types of the cartridge 4, that is, colors of the liquid contained in the cartridge 4. When the correct type of the cartridge 4 is inserted into the corresponding slots 61C to 61K in the mounting process of the cartridge 4, the cartridge-side identification member 430 can pass through between the apparatus-side identification members 630 without colliding with the apparatus-side identification member 630.

As illustrated in FIGS. 11 and 13, the cartridge guide portion 447 extends along the insertion direction D1. In FIGS. 11 and 13, single hatching is given to the cartridge guide portion 447 for the sake of easy understanding. The cartridge guide portion 447 extends along the insertion direction D1 from a part where the corner portion 89 is located to a part where the opening portion 446 is located. That is, in the width direction of the cartridge 4, a first cartridge guide portion 447*a* is located on one side of the opening portion 446, and a second cartridge guide portion 447*b* is located on the other side of the opening portion 446. The cartridge guide portion 447 is guided to the insertion direction D1 by the apparatus guide portion 602 of the cartridge mounting portion 6. As illustrated in FIG. 13, the cartridge guide portion 447 is formed on each of the first side wall 45 and the second side wall 46, specifically, on the first adapter side wall 85 and the second adapter side wall 86.

The cartridge guide portion 447 is formed on each of the first adapter side wall 85 and the second adapter side wall 86 by a step. That is, for the width of the cartridge 4, a part including the bottom wall 44 is smaller than the other part which is farther from the bottom wall 44 than the part. As a result, a step forming the cartridge guide portion 447 is formed. The cartridge guide portion 447 is a surface toward the −Z direction. The cartridge guide portion 447 formed on the first adapter side wall 85 is referred to as the first cartridge guide portion 447*a*, and the cartridge guide portion 447 formed on the second adapter side wall 86 is referred to as the second cartridge guide portion 447*b*.

When the cartridge 4 is inserted into the cartridge mounting portion 6, the cartridge guide portion 447 comes into contact with a surface of the apparatus guide portion 602 on the +Z direction side to guide the movement of the cartridge 4 to the insertion direction D1 while maintaining a posture of the cartridge 4. In a process in which the cartridge 4 is inserted into the accommodation chamber 61, a surface of the first apparatus guide portion 602*a* on the +Z direction side comes into contact with the first cartridge guide portion 447*a*, and a surface of the second apparatus guide portion 602*b* on the +Z direction side comes into contact with the second cartridge guide portion 447*b*.

In the mounting process, the supply portion positioning portion 448 accommodates the apparatus-side supply portion positioning portion 644, and positioning of the liquid supply portion 442 to the liquid introduction portion 642 is performed. Specifically, in the supply portion coupling process of the mounting process, the supply portion positioning portion 448 accommodates the apparatus-side supply portion positioning portion 644 and restricts the movement of the supply portion positioning portion 448 in a direction intersecting with the coupling direction D2, and the positioning of the liquid supply portion 442 to the liquid introduction portion 642 is performed. The supply portion positioning portion 448 is formed on the bottom wall 44, and is a recess recessed from an outer surface of the bottom wall 44. The supply portion positioning portion 448 is located between the opening portion 446 and an end to which the adapter front wall 82 is coupled in the bottom wall 44. In other embodiments, the supply portion positioning portion 448 may be a hole penetrating the bottom wall 44.

The cartridge engagement portion 497 is provided on the rear wall 47, specifically, the adapter rear wall 87. The cartridge engagement portion 497 is a recess recessed from an outer surface of the adapter rear wall 87. The cartridge engagement portion 497 is provided in the vicinity of the end of the adapter rear wall 87 that intersects with the adapter bottom wall 84. As illustrated in FIG. 6, the cartridge engagement portion 497 engages with the mounting engagement portion 697 by entering the mounting engagement portion 697 thereinto in the mounted state. Through the engagement, the mounted state of the cartridge 4 in the cartridge mounting portion 6 is maintained.

As illustrated in FIG. 13, the circuit board 50 is arranged on a terminal arrangement portion 90 that is provided in the adapter 402. The circuit board 50 has a cartridge-side terminal 521 that comes into contact with the apparatus-side terminal 721 in the mounted state.

As illustrated in FIGS. 11 and 12, the cartridge 4 further includes a first attachment portion 54, a second attachment portion 55, and the film 200. The first attachment portion 54 and the second attachment portion 55 are parts where the film 200 is peelably attached to the adapter bottom wall 84 by heat welding, an adhesive, or the like, respectively. The first attachment portion 54 and the second attachment portion 55 are projections provided on the adapter bottom wall 84, respectively. The first attachment portion 54 is formed to surround the opening portion 446. The second attachment portion 55 is formed to surround the supply portion positioning portion 448 other than the opening portion 446.

The film 200 is peelably attached to the adapter 402 as an arrangement portion while covering the opening portion 446, as illustrated in FIG. 12. Specifically, the film 200 is attached to the first attachment portion 54 and the second attachment portion 55 of the bottom wall 44. In the step before the cartridge 4 is mounted in the cartridge mounting portion 6, the user peels off the film 200 from the cartridge 4. The film 200 is formed of a synthetic resin such as polyethylene terephthalate or polypropylene. As illustrated in FIG. 12, the film 200 partially has a crease 202 along the width direction of the cartridge 4, but is not limited thereto. The film 200 may have a planar shape without the crease 202. In the present embodiment, the film 200 has a planar shape when attached to the bottom wall 44. Meanwhile, the cartridge 4 is sealed in a decompressed bag when shipped. In the sealed state, the film 200 is bent into a shape along a shape of the cartridge main body 41. Therefore, when the cartridge 4 is taken out of the bag, the crease 202 formed when sealed may be maintained.

Here, the liquid supply portion 442 is provided with a valve mechanism that is opened when the liquid introduction portion 642 is inserted into the liquid supply portion 442 and closed in a state in which the liquid introduction portion 642 is not inserted into the liquid supply portion 442. However, when impact is applied to the cartridge 4 due to drop of the cartridge 4 or the like, the valve mechanism is temporarily opened, such that the liquid may leak from the liquid supply portion 442. The film 200 covers the opening portion 446, such that the liquid is prevented from scattering to the outside of the cartridge 4 even if the liquid leaks from the liquid supply portion 442 to the outside.

The film 200 has a rectangular shape in a state in which the crease 202 is not formed. The film 200 includes a first film side portion 205, a second film side portion 206, a first film end 208, and a second film end 209, defining a rectangular outer shape. The first film side portion 205 forms one end of the film 200 in the X direction which is a lateral direction of the cartridge 4. The second film side portion 206 forms the other end of the film 200 in the X direction. The first film end 208 forms one end of the film 200 in the Y direction which is the longitudinal direction of the cartridge 4. That is, the first film end 208 is located at an end of the film 200 on the removal direction side of the cartridge 4. The second film end 209 forms the other end of the film 200 in the Y direction. That is, the second film end 209 forms an end of the film 200 on the insertion direction D1 side of the cartridge 4.

As illustrated in FIG. 14, a liquid absorbent material 302 absorbing the liquid is arranged on an inner surface 200*fa* of the film 200. Specifically, the liquid absorbent material 302 is arranged at a part of the inner surface 200*fa* that faces the supply portion distal end 442*a,* which is the distal end of the liquid supply portion 442. The liquid absorbent material 302 has, for example, a sheet shape. In addition, an outer shape of the liquid absorbent material 302 can employ various shapes such as circle and rectangle. The liquid absorbent material 302 is a member for holding the liquid by a predetermined capillary force, and may be a member formed of, for example, a foamable member such as urethane foam, a porous body formed of polyvinyl alcohol, and non-woven fabric. The film 200 has the liquid absorbent material 302, such that even if the liquid leaks from the liquid supply portion 442 due to the impact applied when the cartridge 4 is dropped or collides with other objects, the leaked liquid can be absorbed by the liquid absorbent material 302. Thus, the liquid can be prevented from scattering to the outside when the film 200 is peeled from the cartridge.

Furthermore, when the mounting process of the cartridge 4 is performed in a state in which the film 200 is attached to the adapter 402 without peeling, the film 200 is arranged at a position between the printing apparatus 10 and the mounting element 700 at the time before the mounting of the cartridge is completed. That is, when the mounting process of the cartridge 4 is performed in a state in which the film 200 is attached to the adapter 402 without peeling, the film 200 comes into contact with an element of the printing apparatus 10 that cooperates with the mounting element 700. Hereinafter, a positional relationship between the film 200 and the mounting element 700 will be described in detail.

As illustrated in FIG. 13, in a first case when the cartridge 4 is viewed from the bottom wall 44 in the direction along the central axis CA2, the cartridge 4 has the following first positional relationship. That is, in the first case, the film 200 is attached to the adapter 402 while protruding outward from the cartridge guide portion 447 so as to overlap a part of the cartridge guide portion 447. That is, in the X direction which is the lateral direction of the cartridge 4, the first film side portion 205 is located outward from the first cartridge guide portion 447*a* so as to overlap a part of the first cartridge guide portion 447*a*. In addition, in the X direction, the second film side portion 206 is located outward from the second cartridge guide portion 447*b* so as to overlap the second cartridge guide portion 447*b*. In the present embodiment, the cartridge 4 has the first positional relationship because a dimension of the film 200 in the lateral direction of the cartridge 4 is larger than an interval between the first cartridge guide portion 447*a* and the second cartridge guide portion 447*b* in the lateral direction. Since the cartridge 4 has the first positional relationship, as illustrated in the mounting process, specifically, FIGS. 2 and 3, when the terminal coupling process for moving the cartridge 4 along the insertion direction D1 is performed, the film 200 is interposed between the apparatus guide portion 602 illustrated in FIG. 8 and the cartridge guide portion 447. As a result, the cartridge 4 is not smoothly moved to the insertion direction D1. Thus, in the terminal coupling process which is a step before the film 200 collides with the liquid introduction portion 642, the user can be conscious of the omission of the peeling of the film 200. As a result, it is possible to prevent the film 200 from colliding with the liquid introduction portion 642 and adhering the liquid to the outer surface of the film 200.

As illustrated in FIG. 12, the film 200 is attached to the bottom wall 44 while covering the supply portion positioning portion 448. When the mounting process, specifically, the supply portion coupling process for transitioning from the state illustrated in FIG. 3 to the state illustrated in FIG. 4 is performed, the film 200 is interposed between the apparatus-side supply portion positioning portion 644 and the supply portion positioning portion 448 in a state before the coupling between the liquid introduction portion 642 and the liquid supply portion 442 is started. As a result, as the apparatus-side supply portion positioning portion 644 collides with the film 200, the cartridge 4 is not smoothly moved to the coupling direction D2. Thus, in the step before the film 200 collides with the liquid introduction portion 642, the user can be conscious of the omission of the peeling of the film 200. As a result, it is possible to prevent the film 200 from colliding with the liquid introduction portion 642 and adhering the liquid to the outer surface of the film 200.

As illustrated in FIG. 13, in a first case when the cartridge 4 is viewed from the bottom wall 44 in the direction along the central axis CA2, the cartridge 4 has the following second positional relationship. That is, in the first case, the film 200 is attached to the adapter 402 while protruding outward from the rear wall 47, specifically, the adapter rear wall 87 as an arrangement portion rear wall. That is, in the Y direction which is the longitudinal direction of the cartridge 4, the first film end 208 is located outward from the adapter rear wall 87. Since the cartridge 4 has the second positional relationship, when the mounting process, specifically, the supply portion coupling process for transitioning from the state illustrated in FIG. 3 to the state illustrated in FIG. 4 is performed, the film 200 is interposed between the mounting engagement portion 697 illustrated in FIG. 6 and the cartridge engagement portion 497, in the step before the mounting is completed. As a result, as the mounting engagement portion 697 collides with the film 200, the cartridge 4 is not smoothly moved to the coupling direction D2. Therefore, before the mounting of the cartridge 4 in the cartridge mounting portion 6 is completed, the user can be conscious of the omission of the peeling of the film 200. In the present embodiment, when the first film end 208 side of the film 200 is bent so as to come into contact with the adapter rear wall 87, the first film end 208 protrudes outward from the adapter rear wall 87 to the extent that the film 200 covers at least a part of the cartridge engagement portion 497. That is, in the film 200, a length L200 (illustrated in FIG. 12) of a part protruding outward from the adapter rear wall 87 is longer than a length L497 (illustrated in FIG. 11) from the bottom wall 44 to the cartridge engagement portion 497. As a result, in the mounting process, the part of the film 200 that protrudes outward from the adapter rear wall 87 is located so as to cover a part of the cartridge engagement portion 497 that is bent by being pushed against the mounting engagement portion 697. Thus, the film 200 can be more accurately interposed between the mounting engagement portion 697 and the cartridge engagement portion 497.

According to the present embodiment, in the mounting process, the film 200 is arranged at a position where it is interposed between the cartridge mounting portion 6 and the cartridge guide portion 447, the supply portion positioning portion 448, and the cartridge engagement portion 497 which constitute the mounting element 700. As a result, the mounting operation of the cartridge 4 in the cartridge mounting portion 6 is not smoothly performed by the film 200. Therefore, before the mounting of the cartridge 4 in the cartridge mounting portion 6 is completed, the user can be conscious of the omission of the peeling of the film 200. Thus, the user can prevent the omission of the peeling of the film 200. Accordingly, before the mounting of the cartridge in the cartridge mounting portion is completed, since the film 200 is peeled from the cartridge 4, the coupling between the liquid supply portion 442 and the liquid introduction portion 642 can be normally performed. Further, components of the printing apparatus 10, for example, the liquid introduction portion 642 can be prevented from being damaged by the film 200.

B. Other Embodiments:

B-1. Other Embodiment 1:

In the present embodiment, the film 200 is located outward from the first cartridge guide portion 447*a* and the second cartridge guide portion 447*b* in the X direction which is the lateral direction of the cartridge 4. However, the present embodiment is not limited thereto. For example, the film 200 may be located outward from any one of the first cartridge guide portion 447*a* and the second cartridge guide portion 447*b* in the X direction which is the lateral direction of the cartridge 4. Even in such a manner, since the film 200 is arranged at a position where it is interposed between the apparatus guide portion 602 and the cartridge guide portion 447 in the mounting process, the mounting operation of the cartridge 4 in the cartridge mounting portion 6 is not smoothly performed by the film 200. Therefore, before the mounting of the cartridge 4 in the cartridge mounting portion 6 is completed, the user can be conscious of the omission of the peeling of the film 200.

B-2. Other Embodiment 2:

In the above-described embodiment, in the mounting process, the film 200 is arranged at a position where it is interposed between the cartridge mounting portion 6 and the cartridge guide portion 447, the supply portion positioning portion 448, and the cartridge engagement portion 497 which constitute the mounting element 700. However, the present embodiment is not limited thereto. For example, in the mounting process, the film 200 may be arranged at a position where it is interposed between any one mounting element 700 of the cartridge guide portion 447, the supply portion positioning portion 448, and the cartridge engagement portion 497, which constitute the mounting element 700, and the cartridge mounting portion 6. Even in such a manner, since the film is interposed between the mounting element 700 and the cartridge mounting portion 6 in the mounting process, the user can be conscious of the omission of the peeling of the film 200 in the mounting process.

B-3. Other Embodiment 3:

The present disclosure is not limited to an ink jet printer and an ink cartridge thereof, but can be applied to a cartridge mounted in any printing apparatus that ejects other liquids except for ink. For example, various printing apparatuses and cartridges thereof can be applied as follows.

(1) Image recording apparatus such as a fax machine (2) Printing apparatus that ejects color materials used in manufacturing a color filter for an image display apparatus such as a liquid crystal display (3) Printing apparatus that ejects electrode materials used in forming electrodes such as an organic electroluminescence (EL) display or field emission display (FED)

(4) Printing apparatus that ejects a liquid including bio-organic matters used in manufacture of a biochip
(5) Sample printing apparatus as precision pipette
(6) Printing apparatus of lubricating oil
(7) Printing apparatus of resin liquid
(8) Printing apparatus that ejects lubricating oil to a precision machine, such as a watch and a camera, with a pinpoint
(9) Printing apparatus that ejects a transparent resin liquid, such as an ultraviolet curable resin liquid, to a substrate to form a micro-hemispherical lens (optical lens) used for an optical communication element or the like
(10) Printing apparatus that ejects an acidic or alkaline etching solution to etch a substrate or the like
(11) Printing apparatus including a liquid ejecting head that discharges any other minute amount of liquid droplets The "liquid droplets" refers to a state of the liquid discharged from the printing apparatus, and includes those having trails with particles, tears, or threads. In addition, the "liquid" here may be any material that can be ejected by the liquid ejecting apparatus. For example, the "liquid" may be a material in a state where the substance is in a liquid phase, and liquid materials with high or low viscosity and liquid materials such as sol, gel water, other inorganic solvents, organic solvents, solutions, liquid resins, and liquid metal are also included in the "liquid". In addition, the "liquid" includes not only a liquid as one state of a substance but also a "liquid" obtained by dissolving, dispersing or mixing particles of a functional material made of a solid such as a pigment or metal particles in a solvent. In addition, representative examples of the liquid include ink and liquid crystal as described in the above embodiment. Here, the ink includes various liquid compositions such as normal water-based ink and oil-based ink, gel ink, and hot-melt ink.

C. Other Aspects:

The present disclosure is not limited to the above-described embodiment, and can be realized with various configurations without departing from the spirit of the present disclosure. For example, the technical features of the embodiments corresponding to the technical features in each embodiment described below can be appropriately replaced or combined to solve some or all of the above-described problems, or to achieve some or all of the above effects. In addition, when the technical feature is not described as essential in the present specification, it can be deleted as appropriate. In addition, when the technical feature is not described as essential in the present specification, it can be appropriately deleted.

(1) According to an aspect of the present disclosure, there is provided a cartridge that is detachably mounted in a printing apparatus including a liquid introduction portion. The cartridge includes: a liquid containing portion containing a liquid; a liquid supply portion coupled to the liquid introduction portion and supplying the liquid to the printing apparatus; an arrangement portion having the liquid supply portion arranged inside thereof and having a bottom wall in which an opening portion through which the liquid introduction portion is inserted is formed; and a film peelably attached to the arrangement portion while covering the opening portion, in which the arrangement portion further has a mounting element cooperating with the printing apparatus in at least one of a mounting process which is a process for mounting the cartridge in the printing apparatus and a mounted state in which the cartridge is mounted in the printing apparatus, and the film is arranged at a position where the film is interposed between the printing apparatus and the mounting element when the mounting process is performed in a state in which the film is attached to the arrangement portion. According to the aspect, since the film is arranged at a position where the film is interposed between the printing apparatus and the mounting element in the mounting process, a mounting operation of the cartridge in the printing apparatus is not smoothly performed by the film. Therefore, before the mounting of the cartridge in the printing apparatus is completed, the user can be conscious of the omission of the peeling of the film. Thus, the user can prevent the omission of the peeling of the film.

(2) In the aspect, the arrangement portion may have a side wall intersecting with the bottom wall and extending along an insertion direction in which the cartridge is inserted into the printing apparatus, the side wall may have a cartridge guide portion, as one of the mounting elements, extending along the insertion direction and guided to the insertion direction by the printing apparatus, and when the cartridge is viewed from the bottom wall, the film may be attached to the arrangement portion while protruding outward from the cartridge guide portion. According to the aspect, when the mounting process is performed, the film is interposed between an apparatus guide portion and the cartridge guide portion. As a result, a movement of the cartridge in the insertion direction is not smoothly performed by the film. Therefore, before the mounting of the cartridge in the printing apparatus is completed, the user can be conscious of the omission of the peeling of the film.

(3) In the aspect, the arrangement portion may further have a supply portion positioning portion, as one of the mounting elements, having a recess shape formed in the bottom wall, accommodating an apparatus-side supply portion positioning portion of the printing apparatus, and restricting a movement of the liquid supply portion to the liquid introduction portion, and the film may be attached to the arrangement portion while covering the supply portion positioning portion. According to the aspect, the film is interposed between the apparatus-side supply portion positioning portion and the supply portion positioning portion in the mounting process. As a result, as the apparatus-side supply portion positioning portion collides with the film in the mounting process, the cartridge for mounting is not smoothly moved. Thus, the user can prevent the omission of the peeling of the film.

(4) In the aspect, the arrangement portion may further have a rear wall intersecting with the bottom wall and having a cartridge engagement portion, as one of the mounting elements, engaging with a mounting engagement portion of the printing apparatus to maintain the mounted state of the cartridge in the printing apparatus, and the film may be attached to the arrangement portion while protruding outward from the rear wall. According to the aspect, when the mounting process is performed, the film is interposed between the mounting engagement portion and the cartridge engagement portion in a state before the mounting of the cartridge in the printing apparatus is completed. As a result, as the mounting engagement portion collides with the film, the cartridge for mounting is not smoothly moved. Thus, the user can prevent the omission of the peeling of the film.

(5) In the film, a length of a part protruding outward from the rear wall may be longer than a length from the bottom wall to the cartridge engagement portion. According to the aspect, the film can be more accurately interposed between the mounting engagement portion and the cartridge engagement portion in the mounting process.

(6) In the aspect, a liquid absorbent material may be arranged at a part of an inner surface of the film that faces a supply portion distal end, which is a distal end of the liquid supply portion. According to the aspect, even if the liquid leaks from the liquid supply portion due to impact applied when the cartridge is dropped or collides with other objects, the leaked liquid can be absorbed by the liquid absorbent material. Thus, the liquid can be prevented from scattering to the outside when the film is peeled from the cartridge.

In addition to the aspect described above, the present disclosure can be realized as aspects such as a method of manufacturing a cartridge and the printing system including the cartridge and the printing apparatus.

What is claimed is:

1. A cartridge that is detachably mounted in a printing apparatus including a liquid introduction portion, the cartridge comprising:

a liquid containing portion containing a liquid;

a liquid supply portion coupled to the liquid introduction portion and supplying the liquid to the printing apparatus;

an arrangement portion having the liquid supply portion arranged inside thereof and having a bottom wall in which an opening portion through which the liquid introduction portion is inserted is formed; and a film peelably attached to the arrangement portion while covering the opening portion, wherein the arrangement portion further has a mounting element cooperating with the printing apparatus in at least one of a mounting process which is a process for mounting the cartridge in the printing apparatus and a mounted state in which the cartridge is mounted in the printing apparatus, the mounting element includes a cartridge-side identification member with at least one or more ribs, each rib being at a respective position on the mounting element, the cartridge-side identification member has a pattern shape corresponding to a number of the one or more ribs and the position of each rib on the mounting element, the pattern shape indicating a color of the liquid based on the number of the one or more ribs and the position of each rib on the mounting element, and the film is arranged at a position where the film is interposed between the printing apparatus and the mounting element when the mounting process is performed in a state in which the film is attached to the arrangement portion.

2. The cartridge according to claim 1, wherein the arrangement portion has a side wall intersecting with the bottom wall and extending along an insertion direction in which the cartridge is inserted into the printing apparatus, the side wall has a cartridge guide portion, as a portion of the mounting element, extending along the insertion direction and guided to the insertion direction by the printing apparatus, and when the cartridge is viewed from the bottom wall, the film is attached to the arrangement portion while protruding outward from the cartridge guide portion.

3. The cartridge according to claim 1, wherein the arrangement portion further has a supply portion positioning portion, as a portion of the mounting element, having a recess shape formed in the bottom wall, accommodating an apparatus-side supply portion positioning portion of the printing apparatus, and restricting a movement of the liquid supply portion to the liquid introduction portion, and the film is attached to the arrangement portion while covering the supply portion positioning portion.

4. The cartridge according to claim 1, wherein the arrangement portion further has a rear wall intersecting with the bottom wall and having a cartridge engagement portion, as a portion of the mounting element, engaging with a mounting engagement portion of the printing apparatus to maintain the mounted state of the cartridge in the printing apparatus, and the film is attached to the arrangement portion while protruding outward from the rear wall.

5. The cartridge according to claim 4, wherein in the film, a length of a part protruding outward from the rear wall is longer than a length from the bottom wall to the cartridge engagement portion.

6. The cartridge according to claim 1, wherein a liquid absorbent material is arranged at a part of an inner surface of the film that faces a supply portion distal end, which is a distal end of the liquid supply portion.

* * * * *